United States Patent [19]

Martin, Jr. et al.

[11] Patent Number: 5,398,277
[45] Date of Patent: Mar. 14, 1995

[54] FLEXIBLE MULTIPROCESSOR ALARM DATA PROCESSING SYSTEM

[75] Inventors: Edgar C. Martin, Jr.; Kevin P. Duffied, both of St. Louis, Mo.

[73] Assignee: Security Information Network, Inc., St. Louis, Mo.

[21] Appl. No.: 831,978

[22] Filed: Feb. 6, 1992

[51] Int. Cl.$^6$ .................................... H04M 11/00
[52] U.S. Cl. ..................................... 379/39; 379/45; 379/201; 379/207; 379/211; 379/265; 379/266; 379/309
[58] Field of Search ................ 379/39, 40, 41, 42, 379/43, 44, 45, 46, 47, 49, 50, 51, 201, 207, 265, 266, 309, 211; 395/775, 700, 200

[56] References Cited

U.S. PATENT DOCUMENTS

| | | |
|---|---|---|
| Re. 32,468 | 8/1987 | Le Nay et al. ............... 340/506 |
| 3,626,098 | 12/1971 | Lee . |
| 3,694,579 | 9/1972 | McMurray . |
| 3,700,823 | 10/1972 | Chulak . |
| 3,881,060 | 4/1975 | Connell et al. . |
| 3,914,692 | 10/1975 | Seaborn . |
| 3,922,498 | 11/1975 | Aul et al. . |
| 3,937,889 | 2/1976 | Bell et al. . |
| 4,023,139 | 5/1977 | Semburg . |
| 4,141,006 | 2/1979 | Braxton . |
| 4,228,424 | 10/1980 | LeNay et al. . |
| 4,257,038 | 3/1981 | Rounds et al. . |
| 4,259,548 | 3/1981 | Fahey et al. . |
| 4,262,283 | 4/1981 | Chamberlain et al. . |
| 4,310,726 | 1/1982 | Asmuth . |
| 4,319,337 | 3/1982 | Sander et al. . |
| 4,489,220 | 12/1984 | Oliver . |
| 4,493,948 | 1/1985 | Sues et al. . |
| 4,540,849 | 9/1985 | Oliver . |
| 4,555,594 | 11/1985 | Friedes et al. . |
| 4,577,182 | 3/1986 | Millsap et al. . |
| 4,578,536 | 3/1986 | Oliver et al. . |
| 4,622,538 | 11/1986 | Whynacht et al. . |
| 4,623,988 | 11/1986 | Paulson et al. . |
| 4,688,183 | 8/1987 | Carll et al. . |
| 4,710,919 | 12/1987 | Oliver et al. ............... 370/96 |
| 4,774,658 | 9/1988 | Lewin ............... 364/200 |
| 4,800,583 | 1/1989 | Theis ............... 379/67 |
| 4,839,892 | 6/1989 | Sasaki ............... 379/45 |
| 4,839,917 | 6/1989 | Oliver ............... 379/45 |
| 4,893,825 | 1/1990 | Pankonen et al. ............... 379/45 |
| 4,922,514 | 5/1990 | Bergeron et al. ............... 379/49 |
| 4,924,491 | 5/1990 | Compton et al. ............... 379/37 |
| 5,022,067 | 6/1991 | Hughes ............... 379/95 |
| 5,046,088 | 9/1991 | Margulies ............... 379/211 |
| 5,048,075 | 9/1991 | Katz ............... 379/97 |
| 5,061,916 | 10/1991 | French et al. ............... 379/106 |
| 5,077,788 | 12/1991 | Cook et al. ............... 379/45 |
| 5,164,983 | 11/1992 | Brown et al. ............... 379/207 |
| 5,249,223 | 9/1993 | Vanacore ............... 379/266 |
| 5,278,898 | 1/1994 | Cambray et al. ............... 379/266 |

OTHER PUBLICATIONS

P. Ruggieri, "Dial 911 for Profits", *Telecommunications*, May, 1984 (3 pages).

E. Delong, Jr., "Making 911 even better", *Telephony*, Dec. 14, 1987 (pp. 60–63).

E. DeNigris, J. Shanley, P. Weisman and R. Keltgen, "Enhanced 911: emergency call with a plus," *Bell Laboratories Record*, Mar., 1980, (pp. 74–79).

*Primary Examiner*—Curtis Kuntz
*Assistant Examiner*—Stella L. Woo
*Attorney, Agent, or Firm*—Wood, Herron & Evans

[57] ABSTRACT

A multiprocessor alarm data processing system includes a database with identifying information for all the central stations and their subscribers who use the system. Several input processors receive alarm data from the central stations to identify subscribers incurring alarm events. The input processors generate event records for alarm data validated against the database. Several output processors are provided to process the event records to select the appropriate municipal authority and transmit thereto identifying information for a sucscriber incurring an alarm event. The processors may be switched between input and output processing for dynamic internal load shifting and redundant processing systems are provided for inter-system load sharing. A busy-out capable modem is provided to facilitate such inter-system load sharing.

90 Claims, 5 Drawing Sheets

Microfiche Appendix Included
(350 Microfiche, 5 Pages)

| PROC # | FUNCTION ID | WORKING STATUS | TIME STAMP | BUSY/ READY | DESTINATION CODE | REBOOT FLAG |
|---|---|---|---|---|---|---|
| PROC # | FUNCTION ID | WORKING STATUS | TIME STAMP | BUSY/ READY | DESTINATION CODE | REBOOT FLAG |
| PROC # | FUNCTION ID | WORKING STATUS | TIME STAMP | BUSY/ READY | DESTINATION CODE | REBOOT FLAG |
| PROC # | FUNCTION ID | WORKING STATUS | TIME STAMP | BUSY/ READY | DESTINATION CODE | REBOOT FLAG |

FIG. 2

| REPCO # | ZONE | STATUS | INFORMATION |
|---|---|---|---|
| REPCO # | ZONE | STATUS | INFORMATION |
| REPCO # | ZONE | STATUS | INFORMATION |

| SUBSCRIBER ID | REPCO # | INSTA # | PIN | ZONE | STATUS | INFORMATION |
|---|---|---|---|---|---|---|
| SUBSCRIBER ID | REPCO # | INSTA # | PIN | ZONE | STATUS | INFORMATION |
| SUBSCRIBER ID | REPRO # | INSTA # | PIN | ZONE | STATUS | INFORMATION |

FIG. 3

| REC # (1) | SUBSCRIBER ID | REPCO # | ZONE | STATUS | INITIAL TIME STAMP | DESTINATION CODE | COMPLETE TX TIME STAMP |
|---|---|---|---|---|---|---|---|
| REC # (2) | SUBSCRIBER ID | REPCO # | ZONE | STATUS | INITIAL TIME STAMP | DESTINATION CODE | COMPLETE TX TIME STAMP |
| REC # (n) | SUBSCRIBER ID | REPCO # | ZONE | STATUS | INITIAL TIME STAMP | DESTINATION CODE | COMPLETE TX TIME STAMP |
| REC # (n+1) | SUBSCRIBER ID | REPCO # | ZONE | STATUS | INITIAL TIME STAMP | DESTINATION CODE | COMPLETE TX TIME STAMP |

FIG. 4

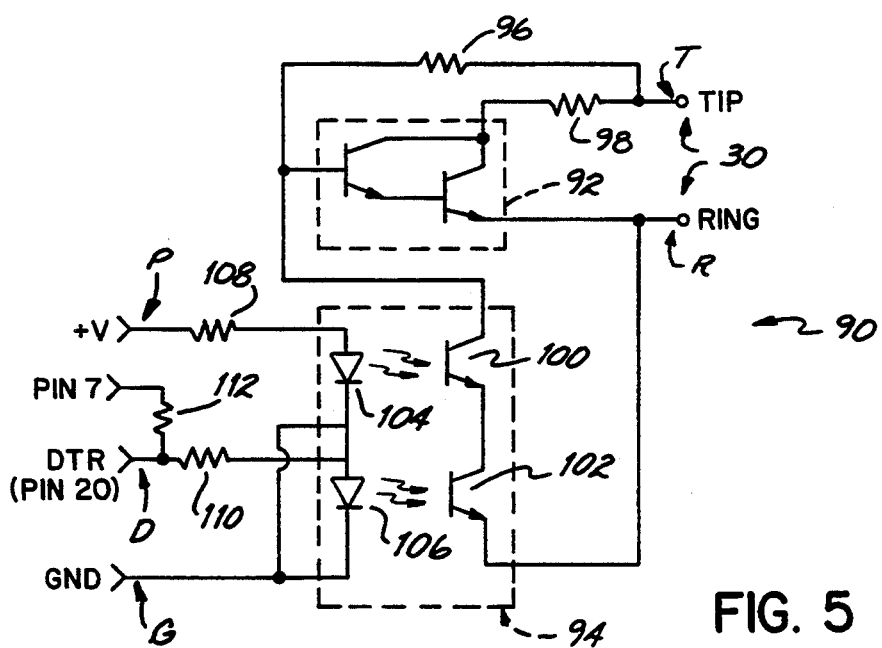

FIG. 5

FLEXIBLE MULTIPROCESSOR ALARM DATA PROCESSING SYSTEM

APPENDIX

Attached hereto as Appendices A and B which is on microfiche having 350 microfiche and 5 pages which show source code listings of software for use with the present invention. The contents of Appendices A and B are incorporated herein by reference. Further, Appendices A and B contain material which is subject to copyright protection. The owner has no objection to facsimile or microfiche reproduction of the appendices, as they appear in the Patent and Trademark Office patent file or records, but otherwise reserves all rights whatsoever.

BACKGROUND OF THE INVENTION

I. Field of the Invention

The present invention relates to flexible multiprocessor data processing systems and more particularly to such systems adapted to provide computerized management of alarm data from a plurality of geographically dispersed sources and for advising municipal authorities such as public service answering points (PSAPs), police, fire or EMS departments of the particulars of those alarms.

II. Description of the Prior Art

A typical alarm reporting system monitors a variety of subscribing residences or businesses connected, such as by telephone lines, to a security company's central station ("CS") whereat electronic signals are received from the monitored location(s) in the event an alarm is triggered such as due to fire or break-in or the like. Upon receipt of that signal, in accordance with the central station's protocol, an operator at the central station telephones the appropriate municipal authority or authorities (such as the police or fire department or both) and orally advises the emergency services operator of the appropriate alarm information. The police or fire services or other necessary emergency services would then be dispatched by the operator. At the same time, other security company central stations as well as various members of the public may be trying to call the municipal authorities for emergency assistance. With such a typical alarm reporting system, multiple, simultaneous calls may thus tie up the emergency services operators causing sometimes tragic delays in response times. Indeed, in the event of a disaster, such as a hurricane, tornado or large scale fire, for example, the volume of calls generated by a single emergency occurrence may be so overwhelming that the operators simply can not process them all. The volume of calls might even be so excessive that the equipment is shut down. In that event, or should the municipal authority otherwise encounter difficulty, the caller may not know that alternative action must be taken to summon assistance. Also, false alarms cannot be easily cancelled in which event limited emergency service resources are caused to respond while another, real emergency, possibly goes unanswered.

It has been proposed to computerize the interconnection between security company central stations and the municipal authority, thus reducing some of the sources of tie ups and the possibility of human error. But such proposed computerized systems have not otherwise overcome many of the problems with currently employed methods. Moreover, the proposed computerized systems have generally required that each security company central station have a computer that is not only equipped with a database containing all the necessary information (such as address, contact persons, special warnings or cautions, nearest police departments, etc.) for each of its subscribers, but which is also powerful enough to process alarm data for each subscriber encountering an alarm condition and compile the necessary reports for electronic transmission to the municipal authorities, all without significant delays. Such hardware is costly and places control of the various computers in the hands of central station operators where error may occur and be difficult to locate. Similarly, standardization is not established as a consequence of which each and every police, fire or EMS department or every PSAP or other municipal authority may be required to have a plurality of terminals adapted to communicate with the respective security company computers making the operation of those municipal authorities not only costly but prone to error and, again, leading to significant delays while the various terminals are monitored by the operators.

SUMMARY OF THE INVENTION

The present invention provides a flexible data processing system such as for a centralized alarm data processing system and which provides the advantages of computerized interconnection between central stations and municipal authorities without requiring added complex computer equipment at the central stations or the municipal authorities and without other drawbacks of previous proposed computerized interconnections. To this end, and in accordance with the broadest principles of the present invention, a multiprocessor data processing system is provided in which information such as for the subscribers of a plurality of central stations throughout the country is maintained in a centralized database coupled to a plurality of input processors and a plurality of output processors within the multiprocessor system. The input processors communicate with the various geographically dispersed data sources such as central stations to receive alarm data therefrom while the output processors concurrently analyze the received data and communicate necessary information to appropriate reception locations such as police, fire, EMS, PSAPs or other responding municipal authorities throughout the country.

Separate input and output processors allow a multiplicity of alarm calls from numerous, different central stations to be handled without delay or tieing up the communication or alarm processing capability of the data processing system such that multiple alarm events may be processed and the municipal authorities provided timely and thorough visual (e.g., printed on a printer at the municipal authority) alarm reports all in virtually real time and without clogging the emergency services telephone lines with numerous alarm calls. Moreover, the data processing system of the present invention may communicate with central stations and municipal authorities throughout the country thus eliminating the possibility of multiple communication standards from the various central stations. More specifically, because the database of the data processing system is compiled from data for all subscribers nationwide, standardization is readily accomplished. Thus, only one data processing system standard is necessary for all central stations and municipal authorities. The central stations may transmit the alarm data to the data processing system with a simple input device adapted for calling and transmitting alarm data in the format desired by the central station. Similarly, each municipal authority may receive alarm information into either its existing computer aided dispatch (CAD) system or printed out on other simple receiving equipment such as a standard printer, facsimile machine or the like.

In accordance with a particular aspect of the present invention, each central station is normally disconnected from the data processing system but completes a communication link, such as by a telephone call, to the data processing system only when necessary to transmit alarm data such as when one or more subscribers' alarm systems have sent electronic signals to the central station reporting a break-in or other alarm conditions. At the data processing system, upon receipt of the call from the central station, an input processor obtains alarm data from the central station and compiles an event record in the central database. After providing confirmation to the central station that the alarm data has been received, the communication link with the central station is terminated thus freeing up both the telephone line and the input processor to handle subsequent calls from any of the central stations. As a consequence, the possibility of delay in receiving alarm data from the central stations in minimized.

Similarly, the municipal authorities need be constantly on-line with the data processing system but instead are "called up" by an output processor when alarm information is to be transmitted to the municipal authority. To this end, and in accordance with the principles of the present invention, an output processor processes the data from an event record created by an input processor and, in conjunction with the subscriber data relevant to that event record from the database, determines which municipal authority is to be notified and compiles an alarm report containing the alarm information (such as location, time of alarm, type of alarm, etc) which is to be electronically transmitted to a receiving device at the designated municipal authority for emergency response. The output processor will then establish the communication link with the municipal authority and transmit the alarm information for the dispatching operator to utilize in dispatching the appropriate public services to the scene. Further, if the output processor cannot connect with the municipal authority, alternate connections with other municipal authorities can be immediately initiated or an operator at the remote system alerted. Thus, if an intended municipal authority has gone off-line or is overloaded, that condition will be detected and the alarm report promptly routed to an alternate authority, or the data processing system operator alerted to take alternative action, thereby again minimizing delay and its potentially tragic consequences.

To expedite processing of alarm information reports to the same municipal authority, a busy/ready feature is provided by the present invention. To this end, when a first output processor is connected to a municipal authority, a status file is flagged indicating which municipal authority that processor has called. In the event a second output processor attempts to connect with a municipal authority but gets a busy signal, the status file flag is checked. If that municipal authority is identified as in-use by the first output processor, the first processor is alerted that another event record is to be send to that authority and a busy/ready file provided with the number of the event record to be so processed. The second processor is then freed up to process another event record. In the meantime, after the first processor completes transmission of the event record it was previously processing, but before terminating the communication link with the municipal authority, the first processor, having been alerted to the existence of another event record to be processed to that same authority, examines the busy/ready file and determines the event record to be so processed. The first output processor then processes that event record and transmits the alarm information report to the municipal authority all without the delay of terminating and reconnecting the communication link with the municipal authority.

Additionally, the flexible nature of the data processing computer system of the present invention permits subscribers to access the system directly via telephone. Using Touch-Tone telephone signals, for example, a unique identification code may be entered by the subscriber allowing cancellation of what turned out to be a false alarm. Similarly, municipal authority operators can access the data processing system to deactivate subscribers or central stations that are sources of numerous false alarms. Indeed, the invention also permits subscribers and central stations alike to use Touch-Tone telephone signals to send alarm data. Such features were simply unachievable with oral reporting systems or with previous proposals to computerize the central station to municipal authority interconnection.

In accordance with another aspect of the present invention, the aforementioned multiple output processors process event records in an interleaved manner to minimize delay between receipt of alarm data from the central stations and transmission of alarm information to the municipal authority. More specifically, when an output processor completes processing of an event record and transmission of the associated alarm information to the municipal authority, it is then available to process another event record. Rather than preassign each output processor a preselected group of alarm event records, this aspect of the present invention contemplates that the first available output processor locate and process the oldest, as yet unprocessed, event record so that delays are kept to an absolute minimum. In a preferred embodiment, each event record is assigned a sequence number indicating the order of receipt of the alarm data. As an output processor becomes available, it will compare the sequence number of the event record it last processed and, if any higher sequence number event records have been recorded, the processor will quickly examine those subsequent event records to find the next event record in the sequence which has yet to be processed by one of the other output processors. That information will then be downloaded to the output processor which will thereafter use the information to access the appropriate portions of the subscriber database for compiling the alarm report and electronic transmission thereof to the municipal authority. In this way, if any one output processor must process a complicated event record or fails to perform adequately, another output processor will "hopscotch" or interleave into the queue to handle the next oldest event record thus minimizing or eliminating delays.

In accordance with an additional aspect of the present invention, the working processors of the system, i.e., the input and output processors (as well as other processors which may be included in the system such as processors provided for housekeeping purposes), can be shifted between input, output or other functions to dynamically or "flexibly" allocate processor resources as needed to ensure that delays do not build in the system. To this end, and in accordance with a further aspect of the present invention, a system supervisor processor is provided to monitor the working processors and the event records and cause the number of those processors functioning as output processors to be increased or decreased to keep up with the event record load. More specifically, if the number of the newest event record exceeds the highest number of the event record being processed by a predetermined amount, such as twice the number of processors currently operating as output processors, the system supervisor will cause one of the housekeeping processors, for example, to change functions and be rebooted as an output processor. If the difference is still exceeded, more housekeeping or perhaps even processors functioning as input processors, will be rebooted accordingly. Alternatively, if the difference exceeds a second, larger predetermined amount, such as three times the number of current output processors, two processors will be concurrently rebooted as output processors. Similarly, as the difference falls below a predetermined number(s), an output processor(s) will be relieved from that duty and shifted over to input or housekeeping duty as necessary. Preferably, housekeeping processors are first to be rebooted to function as output processors in order to maintain input flow as well, although output processing may also take priority over input processing. The reverse priority applies for relieving processors from output duty to other functions.

As a consequence, the data processing system of the present invention is flexible enough to be sure that municipal authorities are alerted in virtually real time irrespective of the input load on the data processing system. Additionally, to further ensure that delays are not encountered due to a malfunctioning processor, the system supervisor periodically monitors performance of each working processor to be sure it is properly performing its assigned function. To this end, each working processor periodically, such as at least once every two minutes, updates a log entry assigned to that processor to indicate its current function (e.g., input, output, etc.) and a time stamp. The system supervisor periodically examines the list of log entries and takes action if any processor either reports the wrong function or has not updated the time stamp recently enough. Such action might be either to disable the processor and assign another processor to that function (especially if it is an output processor and the number of unprocessed event records begins to grow as previously described), or to reboot the processor to the previously assigned function after which it will be disabled if it should again fail to properly respond by the next check of the log list. In the event the processor is disabled, the remote system will thus utilize its flexibility to maintain throughput. Also, an alert will preferably be provided to an operator at the data processing system who may then take corrective action on that processor.

More than one data processing system may be provided. For example, central stations in one portion of the country may normally call into a system in St. Louis while central stations in another part of the country may normally call into another identical system in Chicago. By having more than one such system, other advantages are possible which ensure prompt processing of all alarm calls under virtually any set of circumstances. To this end, the databases in both systems are mirrored, i.e., they are each loaded with the same information for all subscribers from all central stations. Thus, if necessary, a Chicago system, for example, could be utilized to process the alarm calls intended for a St. Louis system or vice versa. In one scenario, if the St. Louis system, for example, was either overloaded, malfunctioning or shut down for maintenance, and thus unable to handle further alarm calls, the input lines to the St. Louis system may be busy'ed-out such as with a modem modified to place a busy load impedence on the incoming telephone line such that the incoming call may be call-forwarded directly to the Chicago system. In that way, the central stations need not take any action yet the system would appear to continue to function normally as far as the central stations and municipal authorities are concerned. Likewise, the municipal authorities would continue to receive alarm information as appropriate without regard to which particular data processing system was doing the processing.

The system supervisor can also utilize the flexible nature of each data processing system to off-load some of the event records between systems. This capability is useful under a scenario in which the difference between processed and unprocessed event records in one system has grown beyond the predetermined amount, but there are not further processors available to be rebooted as output processors. In such event, the system supervisor at that location connects with the system supervisor at the other location and, if that other location has the capacity, a plurality of the event records would be downloaded to the other location for processing as if they were calls into that other location. In the originating system, the downloaded records are flagged as though they had been processed so the originating system supervisor will then note a reduced load and begin rebooting processors to handle other functions. Thus, even in the event of catastrophe in a given locale, the data processing systems continue to run in a manner that is transparent to the central stations and municipal authorities. In such a multiple, redundant data processing system, the system supervisors preferably communicate periodically to update and correlate their databases.

By virtue of the foregoing, there is thus provided a flexible multiprocessor data processing system which is particularly well suited to alarm processing with the advantage of computerized central station to municipal authority interconnection but with little likelihood of significant delays, standardization problems, or other drawbacks encountered in typical alarm reporting systems. These and other objects and advantages of the present invention shall become more apparent from the detailed description of the invention set forth below.

BRIEF DESCRIPTION OF THE DRAWINGS

The accompanying drawings, which are incorporated in and constitute a part of this specification, illustrate the invention and, together with the general description of the invention given above and the detailed description given below, serve to explain the principles of the present invention.

FIG. 2 is a diagrammatic illustration of the file structure of the processor status records of the database of the system of FIG. 1;

FIG. 3 is a diagrammatic illustration of the file structure of the subscriber/central station records of the database of the system of FIG. 1;

FIG. 4 is a diagrammatic illustration of the file structure of the event record files of the database for interleaved output processing by the system of FIG. 1;

FIG. 5 is a schematic diagram of a busy-out capable modem for use with the flexible multiprocessor data processing system of FIG. 1;

DETAILED DESCRIPTION OF THE DRAWINGS

System Overview

Figure 1:
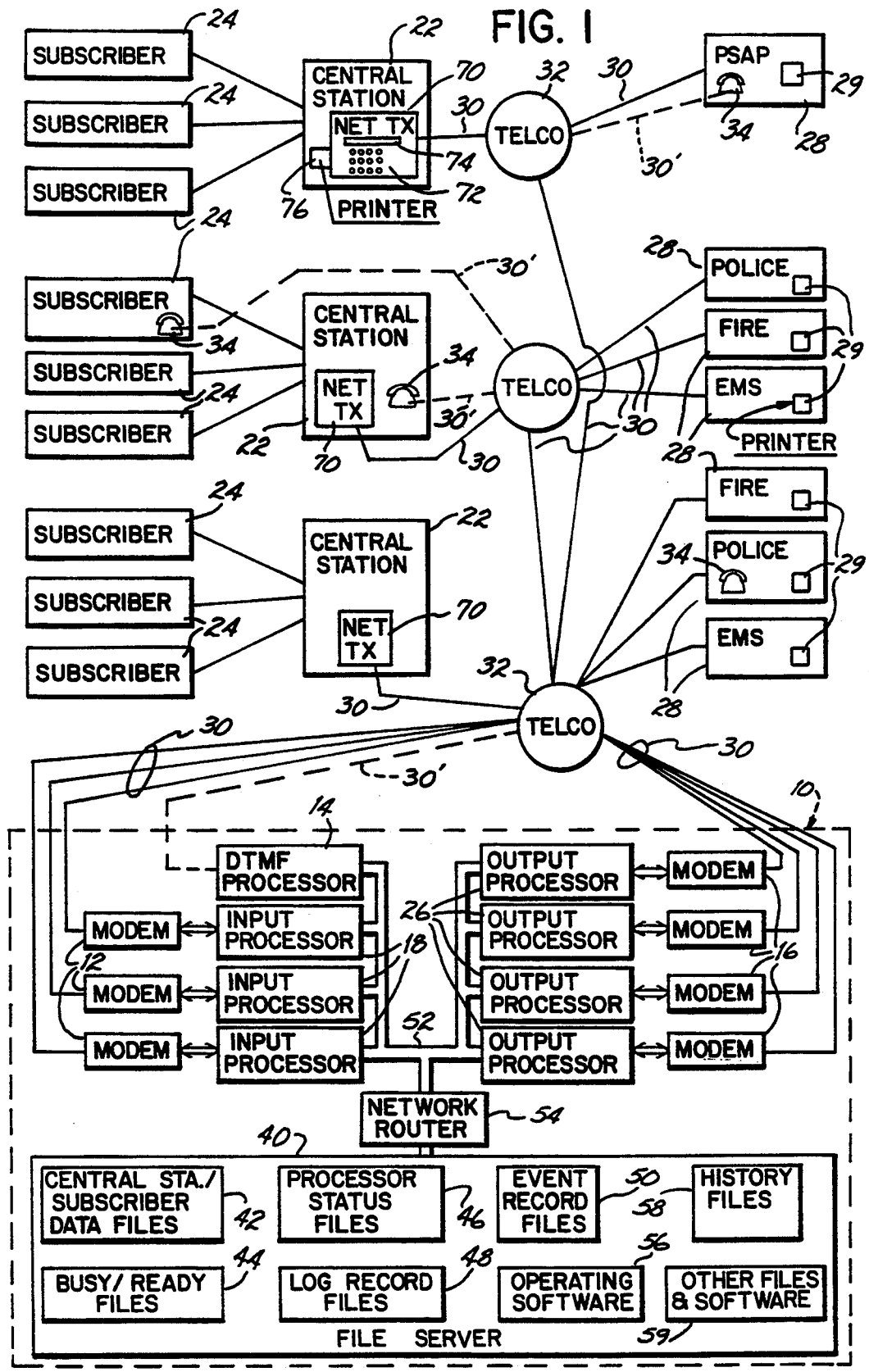
FIG. 1 is a simplified block diagram of a first embodiment of a flexible multiprocessor data processing system in accordance with the principles of the present invention.

With reference to FIG. 1, there is illustrated in simplified block diagram a first embodiment of a flexible multiprocessor data processing system 10 adapted to process alarm data in accordance with the principles of the present invention. System 10 includes a plurality of communication devices such as several input side modems 12 and one or more input side DTMF processors 14 (with DTMF receivers therein), and several output side modems 16. Modems 12 and 16 include standard error-checking and error correcting circuitry and may be Model No. 2400 MNP External modems available from Cardinal Technologies, Inc.

Input side communication devices 12 cooperate with respective input processors 18, and DTMF processors 14 cooperate with their internal DTMF receivers (not shown), to selectively communicate with various distant sources of data such as the various central stations 40 or reporting companies 22 (which may or may not be located in the same geographical area as system 10) for collecting and processing alarm data related to the subscribers 24 (which may also be geographically dispersed) associated with each central station 22. Subscribers 24 may be various residential or commercial locations, for example, whereat alarms may originate. Similarly, output side modems 16 cooperate with output processors 26 to selectively communicate with various distant data receiving destinations such as responding municipal authorities (police, fire, EMS, PSAP, etc.) 28 in the various locales in which subscribers are located so as to provide alarm information reports on printer 29 at that destination, for example, for dispatch of police, fire, ambulance or other services as appropriate. Communication between central stations 22 or municipal authorities 28 and the modems 12 or 16 of system 10, respectively, may be via conventional telephone lines 30 as routed by telephone company switching systems 32 as is commonly understood. Additionally, subscribers 24, central stations 22 and municipal authorities 28 may utilize Touch-Tone telephones 34 to access system 10 under certain circumstances through a DTMF processor 14 as indicated by dashed lines 30' for purposes to be described in greater detail hereinafter.

System 10 also includes a file server 40 containing a common database 42 of subscriber and central station information for all central stations 22 and their subscribers 24 utilizing system 10 as well as busy/ready files 44, processor status files 46, log record files 48 and event record files 50 for input and output processing of alarm data by processors 14, 18 and 26 communicating over network 52 and through network router 54 with file server 40. File server 40 also contains the operating software 56 for system 10. A copy of that operating software is attached hereto in Appendix B. File server 40 may also contain other electronically stored information such as history files 58 or other files 59 for use by the processors 14, 18 or 26, or other processors (not shown) such as for system 10 housekeeping or supervision. Further, each processor preferably also includes its own memory (not shown) for selectively storing programs from software 56 by which to control its operation as well as to temporarily store data being manipulated, and further preferably includes its own I/O facilities for cooperating with its associated communication device. Each DTMF processor 14 (only one shown but more may be utilized) may be a 41B DTMF processor available from Dialogic Corp. The other input and output processors 18 and 26 may be comprised of QL1044 4XT 16 bit add-on cards available from Cubix Corp. and housed within 33 MHz 386 PC network router 54 with router software for a Novell Network and a plurality of LAN cards (not shown). File server 40 may be a 486-25 PC with 16 megabyte of RAM and mirrored 1.5 Gigabyte hard drives and running Novell Advanced Netware 2.15C. A pair of mirrored file servers 40 (only one shown) and mirrored hard drives may be utilized for redundancy.

Processor Status File

Each processor 14, 18 and 26 captures the associated modem 12 or 16 when it powers up as is conventional, and further is assigned a processor identification number (PROC #) and a status record 60 in processor status files 46 associated with that PROC #. As illustrated in FIG. 2, the processor status record 60 contains, in addition to the PROC #, at least a "Function ID" portion to indicate what type of working functions the processor is performing (such as input or output processing), a "working status" portion to indicate the status of the function being performed and a "time stamp" which is periodically updated by the associated processor with the current date and time. Each processor status record 60 also preferably contains a "busy/ready" portion and a "destination" portion to facilitate output processing as will be described. Still further, each processor status record 60 may also include a "reboot flag" portion for dynamic load sharing as will subsequently be described in connection with the system of FIG. 6.

Subscriber/Central Station Files

System database files 42 include information related to all of the central stations 22 which utilize system 10 for reporting alarms to municipal authorities and to all of the subscribers 24 of those central stations. More specifically, and with reference to FIG. 3, database files 42 includes a set of reporting company records 61 listing all central stations 22 by their reporting company number (REPCO #) previously assigned by the operators of system 10. Each record 61 also includes at least an appropriate set of zone code definitions or defaults for that central station and a status flag for purposes to be described, as well as detailed information (e.g., name, address, telephone number, etc.) describing that central station. Files 42 further include sets of subscriber records 62, one such record for each subscriber 24, for use in generating the necessary alarm information reports to the appropriate municipal authority 28. Each subscriber record 62 contains at least a record of the subscriber ID number previously assigned by the operators at system 10 for a subscriber 24, the associated central station REPCO #, a number to identify the company that installed that subscriber's alarm system (INSTA #), a special 4 digit numeric PIN code selected by the subscriber, a status flag, zone code definitions (if the subscriber has specifically defined any) and information such as name, address and the like to be used in generating the alarm information reports. The nature and use of these various database files will become more apparent from an understanding of the input and output processing procedures as will now be described.

Input Processing—Alarm Data

When a central station 22 notes an alarm occurrence at one or more associated subscribers 24, communication between that central station 22 and system 10 is established from the central station such as by using a network transmitter (Net Tx) 70 for transmitting alarm data to system 10 as will now be described. Net Tx 70 may be a credit card swipe device programmed to call a pre-selected number for system 10, such as an "800" number, for example, upon pressing the send (or enter) key on the Net Tx keyboard 72. Net Tx 70 also includes a display 74 and an associated printer 76 for displaying messages to the operator at the central station as received from system 10, whereas the operator may use the plurality of keys 72 to input alarm data to system 10.

Upon noting an alarm occurrence which the operator (not shown) at central station 22 wishes to transmit to system 10 for processing, the operator will depress the "1" key on the Net Tx keyboard 72. This will activate the Net Tx 70 to receive and store subscriber ID numbers and zone codes for use in processing alarm data for the various subscriber(s) 24 which have incurred alarm conditions. More specifically, upon being activated by depression of the "1" key, the Net Tx 70 will display in its display 74 a prompt to the operator to enter the subscriber ID number assigned to the subscriber 24 incurring an alarm condition as well as the zone code for that alarm condition. The subscriber ID number is entered followed by a delimiter such as by depressing the "*" key, followed by entry of a zone code and another delimiter such as the "#" key. If more than one alarm is to be reported at that time, the operator may enter a second set of alarm data, i.e., a second subscriber ID and zone code separated by the above-mentioned delimiters. With Net Tx 70 such as a model number 330 available from Verifone, Inc., and programmed with the software set forth in Appendix A hereto written in TCL programming language, up to ten (10) sets of subscriber ID/zone code combinations may be entered. After the subscriber ID and zone code information has been entered, the operator may back-space through the string of characters to review and/or correct any of the data.

Once the operator decides the data is to be sent to system 10, the "enter" key is depressed causing Net Tx 70 to automatically dial the preselected number which has been hard programmed therein in an attempt to reach system 10. As will be appreciated, Net Tx 70 may also be provided with back-up or alternative numbers for dialing system 10 should the initial number either not answer or be busy. Upon dialing the preselected number, the telephone company switching systems 32 will route the call to an available (non-busy) telephone line coupled to one of input side modems 12 to establish a communication link between that modem (and its associated input processor 18) and the calling Net Tx 70.

On answering the call, the associated input processor 18 of system 10 prompts Net Tx 70 to transmit the unique vendor code (REPCO #) previously assigned to that central station 22. Preferably, the vendor code has been pre-programmed in the Net Tx 70 in encrypted form with a check sum digit and is automatically and electronically transmitted back to system 10 in response to the prompt therefrom. In this way, the operator at central station 22 need not necessarily know the vendor code thus maintaining integrity and control over that information. The subscriber ID and zone code information are then transmitted from Net Tx 70 to the connected modem 12 and processor 18 along with a parity bit for the entire string of data. The vendor code is between 2 and 11 digits long including the check sum digit. Similarly, each subscriber ID number has been preassigned by system 10 and is between 2 and 11 digits long including a check sum digit for error checking. The answering processor also updates its status record 60 with the Function ID (i.e., input processing), indicates in the "working status" portion that a call is being received, and rewrites the time stamp.

As the data is received, the string is evaluated by processor 18 with the parity bit. If there is an error, processor 18 reprompts Net Tx 70 to send the data string again. If after three tries, for example, there is still a parity error, an error message is transmitted to the central station 22 for printing on the printer 76 (such as a model 600 printer available from Verifone, Inc.) associated with the Net Tx 70 and the communication link terminated. Assuming there is no parity error, processor 18 parses the data string in order to process same. To this end, the vendor code and its check sum digit as received by input processor 18 are checked for errors using the check sum digit in known fashion and, if error-free, decrypted. Processor 18 accesses database 42 and compares the decrypted vendor code against the vendor codes contained in records 61 for validation. If the received code is either not error-free, or there is no such listed vendor code (or its status is indicated to be deactivated or cancelled), processor 18 transmits a message to the Net Tx 70 to print instructions for the central station operator to contact an operator at system 10 along with a code to deactivate Net Tx 70 whereafter the communication link is terminated.

On the other hand, if the vendor code is valid, each subscriber ID number received is then examined in turn by processor 18 to be sure it was received error-free. If so, it is then checked against the subscriber ID numbers contained in records 62, to validate whether that subscriber may use the system. Thereafter, the received zone code data for that subscriber is examined to be sure it is a 1 to 4 digit number. For each subscriber/zone code combination or set, if the data is not error-free, or the subscriber ID is not listed in records 62 (or that subscriber's status is indicated to be deactivated or cancelled in a record 62), or no zone code was received (i.e., no digits or more than 4 digits were received), an error message is created indicating that particular combination was not accepted. However, for each combination that is error-free, includes a validated subscriber ID, and has a zone code, an encrypted transaction number is created.

The input processor 18 then creates a log record in log record files 48 identifying the date and time of the call ("time stamp"), the vendor code and all of the received subscriber ID/zone code combinations ("alarm data") each with the associated error message or transaction number, and an identification number (PROC #) of the input processor 18 doing the input processing of that call. The list of subscriber ID/zone code combinations and their associated error messages or transaction numbers is transmitted to printer 76 of the Net Tx 70 for tracking and record keeping purposes by the central station, and for use in reentering, if necessary, any alarm data having an error message. The input processor 18 also updates its status record 60 accordingly.

For each combination or set of alarm data having a validated subscriber ID and a zone code, i.e., for each alarm data combination having a transaction number, the input processor 18 also generates a separate event record 80 with data based upon the validated alarm data which is then stored in files 50. As seen in FIG. 3, each event record 80 contains, for example, the vendor code of central station 22 reporting the alarm, the alarm data (subscriber ID and zone code), a status flag and an initial time stamp (indicating when the record was created), all of which is stored along with the next available or unused record number (REC #) in event records file 50 of system 10. The event record 80 status flag indicates the process status of that event record file (N=new record available for output processing, P=in process, C=cancelled, I=record waiting for intercept, R=repeat event record, Y=processed, B=busy, and F=file not found) with the flag being set initially by input processor 18 to N. Each record also contains a completed transmission (complete Tx) time stamp and a destination code as will be described. The event records become the link to output processors 26 for independent processing of the alarm data without affecting throughput of input processing. Thereafter, the communication link with central station 22 is terminated (and the associated processor status record 60 updated accordingly) freeing up the involved telephone lines 30, modem 12 and input processor 18 for responding to another call from any of the central stations 22.

Alarm data may be received for input processing in other ways. For example, if a central station 22 is in trouble, upon the prompt from processor 18, a special code may be entered indicating a panic situation at the central station. That will cause processor 18 to create a log record and an event record accordingly, which specifies the central station as the subscriber, and the panic, e.g., for police, as the zone code. Further, either a subscriber 24 or a central station 22 could use a Touch-Tone telephone 34 to submit alarm data through DTMF processor 14 using the telephone keys to enter the requested alarm data in response to digitally generated voice prompts from processor 14.

Input Processing—Cancel Alarm

Other input processing is possible such as for cancellation of false alarms. To this end, a subscriber 24 may use Touch-Tone telephone 34 to call a pre-assigned number (such as a different "800" number assigned to a DTMF processor 14 or the same number used by a Net Tx 70 if automatic number identification or ANI is available) which will connect that telephone with an available DTMF processor 14 over telephone lines 30'.

Upon receipt of the call, input processor 14 generates a digital voice message to the telephone caller (not shown) asking the caller to use the touch-tone keys to enter the subscriber ID number pre-assigned to subscriber 24. The processor status record 60 for that processor 14 is also updated to identify the status that a call is being received. Also, the caller is asked to enter the four digit PIN code previously selected by that subscriber. The caller then enters the PIN code via the telephone keys. After receipt of both the subscriber ID and the PIN code, the subscriber ID number is checked against the data in records 62 to see if such a subscriber ID number has been assigned (and has an active status rather than deactivated or cancelled). If the subscriber ID is acceptable (i.e., validated), the PIN code is then verified against that subscriber's record 62 to see if the PIN code is valid. If either the subscriber ID or the PIN code do not verify, a voice message indicating an error is given to the caller and a retry is suggested. Up to three such attempts may be allowed after which the caller is told to call an operator at system 10 and the communication link is terminated (and the processor status record 60 updated). If, however, the subscriber ID and the PIN code are valid, the caller is prompted to enter "0" (a default zone code for cancel) and the call terminated. A log record is then made in file 48 and an event record 80 is created. The event record includes the subscriber ID, PIN code and the "0" zone code to indicate that the call is a cancellation, and the REPCO # from that subscriber's record 62, as well as an "N" status and the initial time stamp previously described (whereafter the appropriate status record 60 is updated). Thus, whether the input consists of actual alarm data or cancellation alarm data, an event record 80 is created for use by output processors 26 as will now be described.

Output Processing—Interleaved Approach

As input processing occurs and event records are being written, other event records are being processed to transmit alarm information in a timely manner. To this end, each output processor 26 independently processes an available event record (process status flag=N), or the processor may idle for a short period if no event records are available for processing. It will usually happen, however, that event records are being created at a rate sufficient to keep output processors 26 busy. But rather than pre-assign output processors 26 (such as a processor being assigned to every fifth event record, for example), processors 26 are programmed to select event records for processing in the most time efficient manner. More specifically, processors 26 interleave in the processing such that the oldest available event record is always the next to be processed by whatever processor 26 is next available, i.e., has completed processing an event record.

As a processor 26 begins to process an event record 80, the process status flag of that record is rewritten to "P", and when completed to "Y", for example. When an output processor 26 completes processing of an event record 80 (e.g., event record number "n"), the event record files 50 will be examined to see if any newer event record 80 (with a sequence number larger than n) has been created. If not, that processor 26 may idle and periodically make that same check. Once a newer event record 80 has been created, available processor(s) 26 will then examine the process status flag of the next event record (n+1). If that record has yet to be processed (status=N), that event record will then be processed. Otherwise, the processor 26 will continue examining processor status flags for sequentially newer event records (n+2, n+3 and so on) until either no more records remain to be processed (whereupon idling will occur until newer event records are available) or an "N" process status flag is encountered thus indicating the oldest, as yet unprocessed event record. That event record will then be processed by processor 26 to thereby provide virtually real time interleaved alarm processing. It will be appreciated that should one of output processors 26 not function properly, the interleaved processing procedure causes other output processors 26 to inherently pick up the load thus further minimizing the possibility of delay.

Output Processing—Event Records

To process an event record 80, the output processor 26 loads the data from the oldest unprocessed event record (e.g., n+1) into its memory, rewrites the process status flag in that event record to "P". The output processor 26 also updates its assigned processor status record 60 with an indication that it is processing an event record along with the sequence number of the event record being processed and a current time stamp. The processor 26 then again examines the central station vendor code (REPCO #) and the subscriber ID in that event record against records 61, 62 in the database files 42 to be sure that the alarm data should still be processed (e.g., the involved subscriber or even the central station had not been deactivated from the system in the interim as will be described). If any of that data does not check, that event record is not to be further processed and instead an operator at system 10 is to be alerted for special handling (e.g., to check the log records file 48 to see if the data has been disturbed or to otherwise make a decision on that event record). In that case, processor 26 rewrites the status flag for that event record in file 50 to "F", and then updates its associated status record 60 to identify that the processor 26 is free for more output processing (including clearing the destination portion of its record) and with the current date and time. That processor 26 is thereafter freed up for processing another event record.

Assuming the data does verify, the zone code in the event record is then examined to see if the record is actually for a cancellation. Specifically, the subscriber record 62 is first checked to see if subscriber zone codes have been defined. If yes, those zone codes are used. If the subscriber has not defined zone codes, then the REPCO # record 61 indicated by the subscriber record 62 is examined to see if that central station has identified zone codes. If yes, those zone codes are used, otherwise system default codes (defined hereafter) are used.

As seen above, one of the zone codes could be a cancellation code such as in the case of an erroneous call-in by the central station 22. However, it is often the case that the subscriber 24 wishes to cancel the alarm call which was initiated when the central station was notified of an alarm occurrence by the alarm system at the subscriber's location. In the past, once the central station 22 notified the municipal authority of an alarm occurrence, the emergency services could not or would not be cancelled. But if the alarm was sent in error (e.g., the homeowner was not quick enough to cancel the automatic signal to the central station), emergency services would still respond and thus may have been unnecessarily diverted from a real emergency. In some localities, false alarms have become such a problem and limited emergency services so strained that sometimes heavy penalties have been imposed on the subscriber for false alarm. Yet, the municipal authorities, for obvious reasons, will typically ignore an oral "false alarm" call, thus bringing on the emergency services and the consequent fines.

The flexible computerized nature of the system of the present invention provides a mechanism for reliably cancelling false alarms. To this end, a subscriber may have utilized a touch-tone telephone as previously described to create an event record for a cancellation. Consequently, upon checking the zone code, if it is determined to be a code indicating cancellation, then an alarm may have been recently received or will soon be received (and an event record created) which alarm is desirably to be treated as a false alarm and cancelled.

One of three scenarios is typical. In many cases, the cancellation call will come in as or after the alarm data event record is being processed to transmit an alarm information report to a municipal authority. In other cases, the subscriber may have called system 10 as a backup to the cancellation call to the central station 22. In that event, system 10 may never get an alarm data call from the central station so no action will be necessary by the system 10 as no alarm could have been or will be called in to the municipal authority. In still other cases, the subscriber call to system 10 will precede the call from central station 22 with alarm data. This occurs because many central stations hold all alarm occurrences for a period of time, e.g., two to four minutes, to allow time for subscribers to call the central station to cancel the alarm. But that call may either not occur, or the central station may be delayed in calling in the alarm data (due to heavy loads or simply forgetfulness) but the subscriber might think it still too late to call the central station to cancel the alarm.

In any of these scenarios, the event record of that call will have a zone code for cancellation. Should that occur, processor 26 accesses event records file 50 and begins checking event records received within the previous 15 minutes, for example. The check proceeds in reverse order and involves searching for event records having the same account (subscriber ID) and having time stamps less than 15 minutes old. If such an event record is found, processor 26 examines the status flag of that event record. If it is either "P" or "Y" indicating that it is in process or has already been processed, then the current event record will be processed as though it were alarm data and sent to the municipal authority but with a message indicating that the previously sent (or concurrently sent) alarm information report is of an alarm that has been cancelled. In this way, the decision whether to respond will be left in the hands of the municipal authority where they are equipped with information indicating that a reliable basis exists for assuming the alarm has been cancelled.

On the other hand, if the prior event record still indicates "N", then the status flags for both that prior event record and the current event record are rewritten by processor 26 to "C" indicating that they are cancelled. In that case, it is unnecessary to send any report to the municipal authority and processor 26 is instead freed up to move on to the next available event record. Processor 26 therefore updates its status record 60 in file 46 indicating the time and that it is free for further output processing. If, however, there are no previous event records involving the pertinent account, then the status flag of the current event record is rewritten to "I" and processor 26 updates its status file as just described and moves on to the next available event record. Any such record with an "I" status flag is thus available for use in a follow-back cancellation procedure which is undertaken whenever an otherwise actual alarm data-filled event record is to be processed as will now be described.

As above, assuming the data in the alarm record has been verified, and the zone code is not a code for a cancellation, then the alarm data contained in the event record is used by processor 26 to access information in the the appropriate subscriber file 62 in database 42 to select the appropriate municipal authority or authorities to contact and to build the alarm information report. Before building that report, however, a follow-back cancellation procedure is undertaken. To this end, before proceeding to examine the subscriber's record 62, processor 26 examines event records files 50 for any event record with a time stamp less than about 15 minutes old and which is for that same subscriber. If such a record is found, the status flag thereof will be examined. If the status flag is "I", then the subscriber 24 chose to call a cancellation in to system 10 before central station 22 even transmitted the alarm data. Nonetheless, the alarm data is then to be treated as a false alarm and an information report is not to be sent to the municipal authority 28. Accordingly, both that prior event record and the current event record will have their status flags rewritten to "C" and no alarm information report will be prepared or transmitted. Similarly, if a prior event record is found for that same account within the prescribed time limit such as 15 minutes, and the data appears to be duplicative, the status flag of the current event record will be set to "R" indicating that it is a repeat of a previously received alarm message in which event a duplicate need not be sent to the municipal authority. In either case, processor 26 updates its status file 46 indicating it is free for further output processing and the processor then moves on to locate and process the next available event record.

After this follow-back cancellation check procedure, if the event record is still to be processed and an alarm information report submitted to a municipal authority, then output processor 26 will utilize the information file 62 for that subscriber and, using the zone code definition previously determined (while checking for cancellation), build up a report containing such alarm information as the identity of the reporting central station; time, day, date of the alarm; the type of alarm (e.g., fire, break-in or other specially designed message based upon the zone code definition); the identity and location of the subscriber, including any nearby cross streets or landmarks for example; a building description; any cautionary information (e.g., nuclear waste, children's bedroom location, etc); and a contact list of responsible people (e.g., which neighbor has an extra key); all to the extent available in database 40 from the subscriber 24. Also, because system 10 is computerized, a service history (such as the date and type of each past alarm) can be built up for each subscriber 24 and central station 22 in history files 58 as each event record is processed. That information may then be accessed and included for transmission in the alarm report or otherwise made available for record keeping and tracking purposes.

The appropriate municipal authority (based upon the information in database 42 for that subscriber 24 and, possibly, the type of alarm as indicated by the zone code) is to be called up by processor 26 via modem 16 and the report then electronically transmitted for printing such as on a printer 29 at that municipal authority 28. Before calling the municipal authority, the output processor updates its status record 60 to indicate the destination (i.e., by writing a code number for the municipal authority being called in the destination portion of record 60) and, as with each update of the status record, updates the time stamp as well. The municipal authority is then called and, upon answering, the alarm information report transmitted to that destination whereafter the involved event record is updated with the date and time in the completed Tx time stamp and the code of that municipal authority in the destination code.

The emergency services operator at that municipal authority may then view several alarm reports and prioritize them without the delays previously encountered in having to handle each alarm call in the order received. Additionally, since reports are transmitted electronically, a number of reports may be received at the same municipal authority within a very short period of time and all at one printer, for example, thus minimizing delays and confusion.

In the event the municipal authority does not answer the call from processor 26 (e.g., there is no answer after a number of rings), processor 26 may try again after a short interval thus eliminating the human error of forgetting to resubmit the call if the first (or even second) attempt fails. If the communication link still cannot be established after 2 or 3 attempts, an alternate municipal authority may be contacted (which might be another printer answering another telephone line at the same municipal authority or another destination if a backup or alternate destination is indicated in the database), or an operator at system 10 advised so that follow-up action may be taken. In that event, the operator may also call the originating central station 22 to advise that the alarm was not called-in to the municipal authority. If more than one municipal authority is to be notified in any event, processor 26 may do so in an almost concurrent fashion by immediately calling up the next municipal authority after the brief time necessary to call-up and transmit the report to the first authority.

When the call is made to the municipal authority, the modem (not shown) associated with the municipal authority's printer 29 will answer the line and place a carrier on the line 30. After the alarm information report is transmitted by output processor 26, the processor 26 will wait a period of time, such as 15 seconds, to allow printer 29 to print the full report and then will transmit a form feed signal to set the printer up for the next report. Line 30 is then checked for the carrier from the modem of printer 29 and if no carrier is present, it is assumed that the report did not go through. The alarm information reports preferably are all the same length and print the same number of lines. Hence, the printer may be modified to count the number of lines printed and cause the modem to drop the carrier if the number of specified lines is not counted within a fixed period of time, such as might occur if the paper jams or the printer runs out of ink. If the carrier is not present, the telephone line is disconnected and the above procedure for a non-answering municipal authority is undertaken.

On the other hand, if the line to the municipal authority is busy, immediate action must be taken. If the line is busy due to failure or problems, the operator at system 10 must be notified immediately. However, it may be that the line is busy because it is in use by another output processor 26. If that is the case, transmission of the second alarm information report is expedited by having the already-connected processor 26 handle the event record for that second report while it is still on-line with the municipal authority immediately after transmission of the current information report. System 10 is provided with the capability via the processor status records to determine whether or not that busy signal is caused by usual traffic or a not-ready condition existing within the equipment, and, via the busy/ready files, to have the on-line processor handle the otherwise delayed event record if the busy is due to usual traffic, all without requiring intervention of the operator of system 10.

More specifically, in the event a first output processor 26 has established a communication link with a municipal authority 28, and a second output processor 26 attempts to call that same municipal authority and receives a busy signal, the second processor reads all of the processor status records 60 to see if another output processor 26 is communicating therewith (by examining the destination codes in those records). If the destination code is found in one of those records, then it is assumed the busy signal is due to normal traffic and not due to an off-line condition at the municipal authority. Should that occur, the busy/ready files 44 may be utilized as described below to facilitate greater output processing throughput. If that destination code is not found in a record 60, however, then some undesired condition is assumed (such as the modem is off-line). In that case, the second output processor 26 moves on to a second or alternate destination for delivery of the report (and updates that processor status record 60 with the new destination code), such as to another police department in that same city, thereby delivering the report in the fastest manner (and/or the processor 26 advises the operator at system 10 of a problem). If the connection can still not be made, the status flag in that event record will be rewritten to "B" indicating busy and the operator at system 10 alerted. That processor 26 then updates its status file as previously described and moves on to the next event record to be processed.

If the busy signal is received because another output processor 26 is communicating with that municipal authority (the destination code was found in one of the records 60), the second processor 26 writes a record in the busy/ready file 44 with a record number, the sequence number of the involved event record, the destination code, an "N" status flag and an initial time stamp. The second processor also rewrites the status flag in the subject event record to "B". Further, the second processor 26 writes the record number of the busy/ready file record and sets a flag in the busy/ready portion of the status record 60 for the first processor 26 connected to the municipal authority to indicate that another event record is to be processed and sent before disconnecting from the municipal authority. The second processor 26 is then freed up to process another event record (and also updates its own status record accordingly), whereas the held-up event record will be taken up for processing as soon as possible.

When an output processor completes transmission of the alarm information report it had generated, the status flag in the associated event record 80 is rewritten to "Y" and a completed transmission time stamp and destination code are written into that record. The processor 26 also updates its status record indicating it has completed sending an alarm information report (and also updates its time stamp). However, before disconnecting from the municipal authority and clearing its destination code, the processor also examines the busy/ready portion of its status record to determine if another event record is to be processed for that same destination. If there is none indicated, i.e., the flag is not set, the communication link with the municipal authority may be terminated and the status record again updated accordingly (including clearing the destination code). If, however, the busy/ready portion flag has been set, the processor 26 will reset that flag (so another processor 26 may again set it, if necessary), and will then go to the indicated record in the busy/ready file 44 to obtain the sequence number of the event record to be processed. The record in the busy/ready file associated with that event record will have its status flag set (e.g., to "P" for processing) and processor 26 will then retrieve the indicated event record and process it as previously described (processor 26 will additionally update the status flag and in-process and completed transmission time stamps in the associated busy/ready record each time it writes those items in the event record 80 as well). Thereafter, and before disconnecting from the municipal authority, the processor will check the busy/ready file for any other records for that destination (as a check in case a third processor 26 noted a busy but the flag in the first processor's status record was already set and therefore could not be set again in which event the third processor would write the busy/ready file anyway). If any such record is found, it is then processed and the processor's status record updated as previously described. The above cycle will be repeated until there are no more records in the busy/ready file for that destination and the flag in the busy/ready portion of that processor's status record is not set.

In a preferred mode of operation, the receiving device such as printer 29 at each municipal authority includes a modem (not shown) such as a conventional error checking modem which has been modified as described in copending application Ser. No. 07/707,846, filed May 30, 1991, the disclosure of which is incorporated herein by reference. It will be appreciated that with an unmodified conventional modem, if printer 29 is turned off, for example, the modem may still respond and answer the call from processor 26 and accept the alarm information report. Unfortunately, no printout will be obtained as printer 29 is off. Use of a modem modified as shown in the aforesaid application minimizes or eliminates the likelihood that the destination 28 will appear to have received the call from processor 26 even though printer 29 was turned off because the line will not be answered by the modem. Further, preferably, the modem connected to printer 29 is further modified as will be described to actually cause line 30 to go busy (referred to as a busy-out modem) if the printer should jam or fail, for example, even though the printer is still turned on. In that case, any processor 26 trying to call on that line will receive a busy signal followed by the check of the processor status records (none of which will have that destination code) thereby causing the calling processor 26 to make alternate connection or alert the operator at system 10 as above described.

Busy-Out Modem

To provide the ability to cause line 30 to go busy, the modem connected to printer 29 may be modified as will now be described in connection with FIG. 5. To this end, the modem is provided busy loading circuit 90 including Darlington transistor 92 (such as a TIP 122 available from Digi-Key Corp.) and dual opto-isolator 94 (such as PS2501-3 NEC available from Digi-Key Corp.) which cooperate with 100 kilohm resistor 96 and 510 ohm (2 watt) resistor 98 to place an effective 300 ohm busy load across the ring and tip connectors (R and T) which connect to the respective ring and tip lines of telephone line 30 whenever either modem power is lost (+v) or the DTR signal (pin 20) is absent, i.e., goes low (such as due to a jam of printer 29). As will be appreciated, placing a 300 ohm impedance across the ring and tip lines is recognized by the telephone company equipment as a busy line.

Specifically, the base and collector of transistor 92 are connected via tip connection T to the tip line through resistors 96 and 98, respectively. When the base and emitter of transistor 92, the latter being directly coupled through connection R to the ring line, are not short circuited via the transistors 100, 102 of opto-isolator 94 (i.e., one or the other or both of transistors 100 and 102 are not turned on), Darlington transistor 92 is biased by the current on the ring and tip lines to effectively place a 300 ohm load thereacross. That situation occurs only when either or both of LED's 104, 106 of opto-isolator 94 are not energized. To this end, LED 104 is in series between the modem power supply connection P (to receive modem power supply voltage (+v)) and a ground connection G (to receive signal ground (GND)) with 3.9 kilohm current limiting resistor 108 such that LED 104 is on only when modem power is available (i.e., the power supply voltage is present), but is off otherwise (i.e., the modem power supply voltage is absent). Similarly, LED 106 is in series between the DTR connection D for the DTR signal (at pin 20 in an RS232 format) and the G connection for GND with 3.9 kilohm current limiting resistor 110 such that LED 106 is off whenever the DTR signal goes low or absent such as occurs if printer 29 jams or fails, for example.

When the modem power supply is operating (+v is present) and the DTR signal is high (the DTR signal is present), indicating that everything is functioning properly, the ring and tip lines will operate in their normal fashion as transistor 102 will be shunted off (the base and emitter shorted together through opto-isolator transistors 100, 102). However, in the event that either the power supply should fail (such as by turning off the modem) or the DTR signal should disappear or go low (due, for example, to a failure or jam or other problem with the modem or with printer 29), one or the other of LEDs 104 and 106 of opto-isolator 94 will not be turned on thus causing opto-isolator transistors 100 or 102 to turn off thereby allowing transistor 102 to be activated and effectively connect a 300 ohm load across the ring and tip lines of telephone line 30.

Additionally, 1 kilohm resistor 112 is connected between pins 20 and 7 in an RS232 pinout arrangement as described in aforesaid application Ser. No. 07/707,846 whereby to prevent the phone line from being answered in the event printer 29 is missing or turned off, for example. The above-described modifications shown in FIG. 5 to the modems may also be employed with at least input side modems 12 for purposes to be described hereinafter.

Zone Codes

Output processors 26 determine which municipal authority to call (e.g., police or fire) based upon the zone code definition. That definition is also given to the municipal authority in the alarm information report to identify the nature or type of alarm occurrence. With the flexible nature of common database 42, several zone code definitions are possible.

In the first instance, each subscriber 24 may self-define the zone codes (if the associated central station 22 is so equipped and decides to handle such). In that event, the list of subscriber defined zone codes will have been stored in the appropriate records 62 of database files 42 for that subscriber and thus available for use in preparing the alarm information report. Additionally, or alternatively, each central station 22 may define a set of zone codes (e.g., codes 1 through 8) applicable to all of its subscribers (or to those who do not define their own). Those zone codes and their definitions are similarly stored in the appropriate records 61. Finally, if no zone codes are defined by subscriber 24 or central station 22, default zone codes may be as follows:

0=cancel
1=fire
2=panic/hold-up
3=burglar alarm sounding
4=EMS

Thus, if a zone code 5 is received for a subscriber 24/central station 22 that did not previously define a zone code 5, no zone would be defined. Whenever a zone code is not defined, it is assumed that the alarm information report is to be transmitted to the nearest police department identified in the subscriber's record 62.

Municipal Authority Shutoff

In some instances, it has occurred that certain subscribers 24, or even some central stations 22, cause an undue number of false alarms with little recourse available to reduce the strain on emergency services (other than after-the-fact fines). With the flexible nature of the system of the present invention, localities may now control such abuses. To this end, a municipal authority may initiate a call to system 10 (such as with Touch-Tone telephone 34) and, via DTMF processor 14, provide the subscriber ID (for the errant subscriber) or the vendor code (for the errant central station) along with an indicator to deactivate that subscriber or central station. The DTMF processor 14 will then rewrite the status flag in that subscriber's record 62 or that central station's record 61 to indicate that it has been deactivated from the files in database 42 (the records may remain but the status flag will be set to indicate that the record has been deactivated and is therefore no longer serviceable). Consequently, upon calling in alarm data, the central station is notified of the lack of access (and given an explanation that the subscriber or the central station has been deactivated). The municipal authority which initiated that deactivization is logged in log record files 48 with the identity of the caller and the deactivated subscriber or central station and time of cancellation for verification and backup. An operator at system 10 may be prompted to call up the affected central station 22 to advise of the situation, and to call the initiating municipal authority 28 to confirm.

Additionally, the system 10 may be used, due to its database with service history information 58, to develop various reports as desired such as by geographic area, subscriber, central station, installers, type of alarm, etc., for use by the central stations or municipal authorities as necessary. Additional processors (not shown) may be coupled to network 52 to provide such housekeeping functions and/or to assist the operator(s) (also not shown) at system 10. Other housekeeping functions may thus include compressing and archiving old out-of-date history files 58; renaming log record files 48 that fill daily; accumulating operational statistics for reports; and performing routine audits and reports.

Overview of Operation

In operation of system 10, upon the event of an alarm condition at a subscriber 24 being monitored by the associated central station 22 (e.g., a door opens at subscriber 24's residence causing an alarm signal to be sent to central station 22), the operator at the central station activates the Net Tx 70 by depressing the "1" key. The subscriber ID and zone code for each received alarm signal which is to be processed by system 10 are then entered into the Net Tx and the "enter" key depressed. The Net Tx dials system 10 to establish a communication link with an available input side modem 12. Alarm data identifying the subscriber(s) 24 and the alarm condition(s), and preferably the central station 22, are electronically transmitted to system 10 for logging by an input processor 18 and an error message(s) and/or a transaction number(s) is transmitted back to the central station. The communication link with the central station 22 will then be terminated and an event record created for each valid subscriber ID/zone code combination received.

An output processor 26 processes the alarm data in the event record as soon as possible and another communication link is established via an output side modem 16 with an appropriate municipal authority 28 as routed by the telephone switching systems. The necessary alarm information is then electronically transmitted to the appropriate authority for use by the emergency operators (not shown) in dispatching emergency services.

The operation of system 10 may be accomplished by utilizing in file server 40 the software (written in Microsoft Professional Development Basic) attached hereto in Appendix B in which event the various files and records will be defined as set forth in that software and with each Net Tx 70 programmed with the software attached hereto in Appendix A.

Although input and output communications are shown using primarily modems, other communication links could be established either for input or output, especially the latter. Thus communication with various municipal authorities could be via cellular telephone, facsimile transmission, direct hard-wire or radio link, or other communication links as will be readily understood. Further voice print identification could be used on the input side or, alternatively, central stations 22 could have computerized call-up and alarm data reporting systems.

Dynamic Internal Resource Allocation

Figure 6:
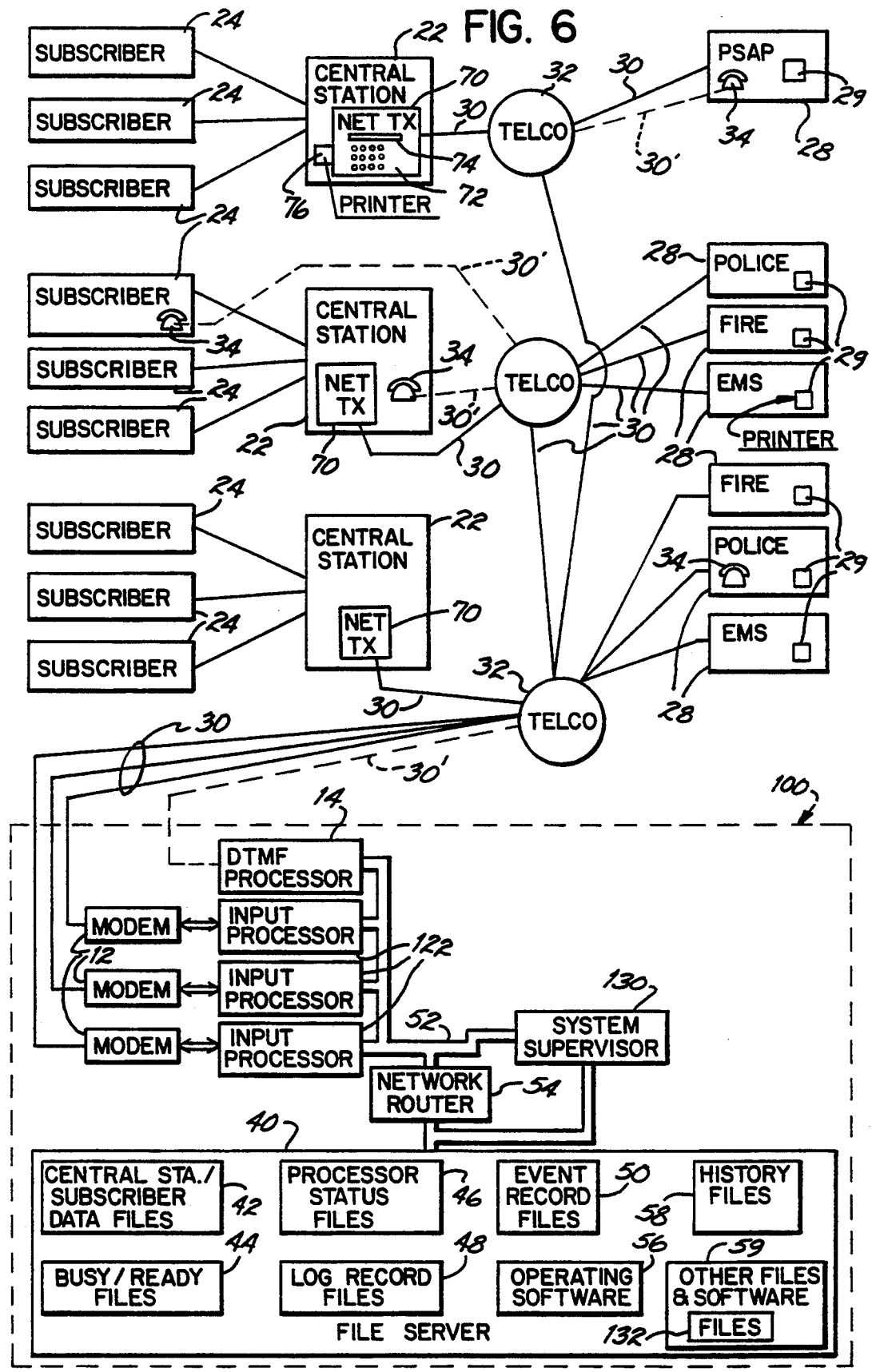
FIG. 6 is a simplified block diagram of a second embodiment of a flexible multiprocessor data processing system in accordance with the principles of the present invention.

Depending upon the load on system 10, it could occur that more alarm data is being received than can be processed without unacceptable delays. To minimize such a possibility, system 10 may be replaced with a second embodiment of a flexible multiprocessor data processing system 120 as illustrated in FIG. 6. System 120 is very similar to system 10 and provides input and output processing in like fashion. To this end, system 120 includes a plurality of communication devices such as modems 12 connected with respective processors 122 (which are made up of what were input and output processors 18 and 26 of system 10, for example) and a plurality of DTMF processors 14. Modems 12 share telephone lines 30 for input and output processing depending upon the required functionality assigned to the associated processor 122. System 120 differs, however, from system 10 in that the various processors 122 are no longer dedicated as input or output processors but are instead assigned, via programming control of system supervisor 130 (such as another 25 MHz 386 PC), to the various working functions of data processing system 120. Processors 122 communicate over network 52 to file server 40 as previously described including network router 54 with system supervisor 130 connected in parallel to file server 40.

System supervisor 130 monitors performance of system 120 and instructs the working processors 122 to undertake appropriate functions such as for input processing or output processing as necessary to maintain throughput of the system without unacceptable delays (any of processors 122 could further be instructed to idle or undertake housekeeping functions such as those previously described for system 10). More specifically, depending upon the size of the load of unprocessed event records, system supervisor 130 may increase or decrease the number of processors 122 functioning as output processors.

When each processor 122 is first powered on, it will initially load up a DOS operating system, initialize and log in (to identify its processor identification number for the network router 54 and the proper status record 60). Thereafter, the processor 122 will load up or boot a set of programs based on a pre-assigned list of programs such as from an AUTOEXEC.BAT file 132 assigned to that processor in file server 40 (or, alternatively, in router 54). The AUTOEXEC.BAT file includes the programs for updating the processor's status records and for the working functions of the processor (such as input processing or output processing), all as previously described, and further to cause the processor to periodically check the status record to see if system supervisor 130 is instructing a change in working functions as will now be described.

As each processor 122 first begins to perform its working function, it updates the associated status record 60 with a code to identify that function (Function ID) for purposes to be described hereinafter. Further, after each processor 122 completes its assigned working function (e.g., after terminating a communication link), it reads the associated processor status record 60 to test the reboot flag. If the reboot flag is not set, the processor proceeds with the same working function and checks the flag on the next completion of that working function. On the other hand, if the reboot flag is set, the processor will reboot to thus reload the AUTOEXEC.BAT file assigned to that processor. More specifically, that processor 122 will reload its DOS operating system, log in and again execute the AUTOEXEC.BAT file 132. However, upon executing the AUTOEXEC.BAT file, the set of programs will include a functional working program in accordance with the dictates of system supervisor 130. That function might be the same as the previous function (in which event system supervisor 130 is testing processor 122 because a possible default has been detected as will be explained) or a new function to shift the load and capacity of the processors of system 120.

System supervisor 130 periodically examines event records files 50 to determine the number of as-yet unprocessed event records (such as by comparing the difference in sequence numbers between the lowest numbered event record having a status flag other than "N" and the newest event record). If the number of such unprocessed event records exceeds a predetermined limit, then greater output processing capacity is necessary to avoid undue delays in processing of event records. System supervisor 130 has the ability, via processor status records 60, to dynamically allocate that load to other processors 122. To this end, system supervisor 130 will locate a processor 122 which is not then performing output processing by examining the Function ID portion of the status records. System supervisor 130 then sets the reboot flag in that processor's status record indicating that the processor is to reboot at the next opportunity. Also, system supervisor 130 renames the working function program in that processor's AUTOEXEC.BAT file to the output processing program so that upon rebooting, the subject processor becomes an output processor and functions accordingly. Thus, if increased output processing capacity is needed, one of the processors which is not currently performing output processing will, within a short period of time, be caused to reboot as an output processor thereby increasing output processing throughput capability of system 120 and reducing delays. Thereafter, on the next check of the event records by system supervisor 130, if the number of unprocessed event records still exceeds the predetermined limit, system supervisor 130 will again examine the processor status files to locate an available processor 122 which will then be caused to reboot as an output processor as previously described.

Preferably, the predetermined limit above which added output capability is needed is twice the number of processors 122 then functioning as output processors. In some cases, if the difference between newest and oldest event records exceeds an even greater limit, such as three times the number of processors functioning as output processors, system supervisor 130 will locate two processors 122 to be rebooted as output processors to thereby more rapidly reduce the load rather than wait to see if one processor will help catch up with the load. Similarly, as the difference between oldest and newest event records begins to decrease, such as when the difference is less than twice the number of processors functioning as output processors, system supervisor 130 will set the reboot flag in one of the processors which is functioning as an output processor to reboot, and will rename the working programing in that processor's AUTOEXEC.BAT file 132 to another function such as either idle or input processing.

Preferably, there are limits on the number of processors 122 functioning as either input processors or output processors at any given time. For example, for every 100,000 subscribers 24 listed in database 42, there are 16 DTMF processors 14 and 32 processors 122, with a maximum of 24 processors 122 operating as input processors at any time and a maximum of 24 processors 122 operating as output processors at any given time. At a minimum, there should be at least two processors 122 for input processing and two for output processing (wherein the two same-function processors are not on the same card if the Cubix cards are used). System supervisor 130 may thus load shift using 32 processors/100,000 subscribers between the maximum and minimum limits set forth above so as to normally not exceed a fifty percent load.

It will be appreciated that the load on system 10 will not always be high. During those times, it may be desirable to place some of processors 122 into an idle mode (where they periodically update and check their processor status records) to conserve power, for example. That is accomplished by rebooting as previously described where the system supervisor 130 has renamed the working function program for those processors with the idle program. Normally, system supervisor 130 will first reboot those idle processors as output processors before utilizing input processors. And upon the load being reduced, system supervisor 130 will first reboot output processors as idle processors before rebooting same to input processing.

From time to time, the operator at system 10, for example, may want some reports, or the files may need to be updated (such as to add a new subscriber 24). Processors 122 which are at idle may be directed to perform such housekeeping functions such as by use of the reboot status flag and renaming the working function program in the associated AUTOEXEC.BAT file with the housekeeping program, or by loading the housekeeping program through network router 54 to be run by the idle processor 122. In the latter event, the processor is not rebooted but merely executes the housekeeping program within the shell of the idle program as is well understood.

When such housekeeping functions are necessary, if no processors are idle, as already determined by a check of Function ID in the processor status records, system supervisor 130 may locate a processor functioning either as a housekeeping processor or an input processor and, in accordance with the previously described reboot process, either reboot that processor as a housekeeping processor or as an idle processor with the housekeeping program written into the idle program shell. The input processor may be so rebooted only if the housekeeping processor is already working on its assigned housekeeping function as those functions are often very long and involved.

As part of its supervisory function over system 120, system supervisor 130 will periodically examine the performance of processors 122 to be sure no processor is failing or defective. Thus, system supervisor 130 will periodically, such as every 3–30 seconds, and also every time the system supervisor completes any task it was performing, examine processors status records 60 for two items. First, the Function ID in the status record as written by the processor 122 is compared to the working function program previously named by system supervisor 130 in the AUTOEXEC.BAT file for that processor. Second, the time stamp is examined to see if it is less than 2 minutes old. If either test is not answered in the affirmative, then the processor 122 may be faulty. In that event, the reboot flag for that processor 122 is set, but the working function program in the AUTOEXEC.BAT file is given the same name it was previously supposed to have so that upon rebooting, the processor will run the same function it was previously supposed to run.

If, on the subsequent check of the status records 60 for that processor, there is still a default, that processor 122 is effectively shut down such as by being rebooted as an idle processor. The operator at system 120 is then alerted to the failed processor such as by a display or printout (now shown) within system 120 indicating the processor number and the failure. Also, if that faulty processor was functioning as an output processor, another available processor 122 is flagged to reboot with an output processing program in the stead of the faulty processor to thereby maintain the flow of output processing.

On the other hand, if the follow-up examination of the status record 60 indicates that the questionable processor has now properly reported in, processing continues as previously described without the need for shutting down any of processors 122.

When system supervisor 130 checks the processor status records 60, it also examines the working status portion of the records 60 for those processors 122 functioning as input processors. If that check reveals those processors are busy handling incoming calls, system supervisor 130 will cause an idle processor 122 to reboot as an input processor, whereas if several input processors are not busy handling incoming calls, one or more input processors 122 will be rebooted as idle processors.

As will be appreciated, when each processor 122 reboots, it will capture the associated modem 12. If the processor 122 is adapted for input processing, the modem will be captured and instructed to auto answer calls. If the processor 122 is adapted for output processing, the captured modem will not answer calls. Then, should a Net Tx call be directed to one of those modems, the call will go unanswered and the Net Tx 70 will redial an alternate number as previously described.

Redundant Systems

Figure 7:
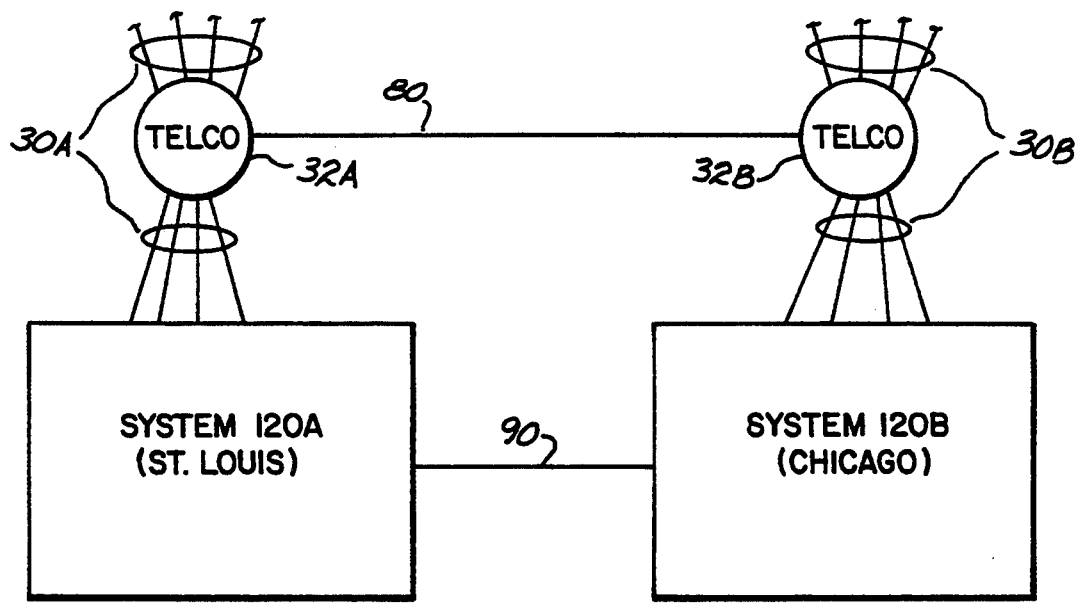
FIG. 7 is a block diagram of a redundant alarm data processing system using two of the flexible systems of FIG. 5.

In a preferred manner of operating the flexible data processing system 120 of the present invention for alarm data processing, it is preferred to have at least a second, redundant data processing system 120. To this end, and as seen in FIG. 7, two data processing systems may be provided (system 120A and system 120B) each located in different locales. For example, system 120A services a number of central stations 22 and subscribers 24 in various parts of the country which ultimately feed into system 120A through the telephone company switching system 32A over telephone lines 30A. Similarly, an identical system 120B, with the same database 42 of subscriber/central station files, services a variety of central stations 22 and subscribers 24 fed in through telephone company switching system 32B over telephone lines 30B. Ordinarily, systems 120A and 120B are servicing their various central stations 22 and subscribers 24 without regard to one another. However, under certain circumstances, it may be necessary or useful for one of the systems, such as system 120A, to either shut down or utilize the output processing resources of system 120B. To this end, and in accordance with the principles of the present invention, a couple of alternatives are provided by which calls from central stations 22 coming in over telephone lines 30A may be diverted such as over telephone lines 80 to system 120B (or vice versa) for processing in a manner identical to that previously described except for the location of the system. Alternatively, or additionally, each system 120A or 120B may determine that the number of event records to be processed has grown so large (such as if the number of as-yet unprocessed event records is five times the number of processors functioning as output processors) as to be beyond the capability of that system to process in a timely manner. In that event, system supervisor 130 within that system will make contact with the system supervisor 130 of the other system such as via telephone line 80 or a high speed data link 90 and, if there is extra capacity available in the second system, will download a number of event records from system 120A to system 120B, for example. The event records which are downloaded from system 120A will be flagged in system 120A as if they were successfully processed (with a "Y") and time stamped whereas the event records received at system 120B from system 120A will then be reassigned new sequence numbers and built into new event records within files 50 of system 120B and thereafter processed as previously described.

As mentioned, a less sophisticated approach is also available in which a system, such as system 120A, for example, effectively shuts down causing all incoming calls to be diverted over telephone line 80 to system 120B. For this purpose, the busy-out capability of modems 12 when modified as described in connection with FIG. 5 may be used along with automatic call forwarding from the telephone companies 32. To this end, whenever a line 30 is to be "busy'ed out", the associated processor 122 is rebooted as an idle processor which causes the communication port (not shown) to close, for example, or otherwise causes processor 122 to indicate that it is not ready, thus causing DTR to go low which busy's line 30 as previously described.

By virtue of the foregoing, should a system, such as system 120A for example, become overwhelmed with calls from central stations 22 or subscribers 24, that condition will remain transparent in use to central stations 22, subscribers 24, and municipal authorities 28 in that a second, redundant system, such as system 120B, will handle all of the processing and alarm information report generation and transmission.

With redundant systems, systems 120A and 120B periodically communicate such as over telephone line 80 or a selectively established high speed data link 90 to correlate their subscriber/central station files 42. That communication link is established and the databases updated whenever a new subscriber 24 is added, for example, or every fifteen minutes otherwise. Normally, one of systems, such as system 120A, is deemed the master system. In that case, the system supervisor 130 of the master system initiates the fifteen minute update checks. Also, new subscribers are preferably added first to the database 42 of the master system 120 and then to the other system as an update.

In order to expedite such inter-system update procedures, it is preferred that the various subscriber records 62, for example, be broken into files with each file having 100,000 subscriber records, for example. To this end, a subscriber with a subscriber ID number AB,-CDE,FGH will be the "DE,FGH" record 62 in a file 42 titled "ABC". In this way, both the slowness caused by huge files comprised of millions of records, the time and cost of maintaining and updating an index for all those records, are avoided.

As is well understood, the Novell network is designed to keep track of changes in the files. If there has been no change in files 42 since the last inter-system update, no further data needs to be exchanged. If however, there has been such a change, the "grouped" file approach allows for easy updating between systems 120A and 120B. To this end, for each file (of 100,000 records), a check sum is created. The check sum for the two redundant files ABC in each system are compared and only in the event the check sums do not match is it necessary to correlate the respective files. Consequently, if a subscriber 24 is deactivated, for example, the systems 120A and 120B need not check each and every subscriber record 62 but need only check and update that group of records in the affected file.

By virtue of the foregoing, there is thus provided a flexible multiprocessor data processing system such as for processing alarm data with only minimal delay, i.e., in virtually real-time and with the advantage of computerized interconnection between central stations and municipal authorities but with few or none of the drawbacks of prior computerized interconnection proposals.

While the present invention has been illustrated by the description of embodiments thereof, and while the embodiments have been described in considerable detail, it is not the intention of applicants to restrict or in any way limit the scope of the appended claims to such detail. By way of example, and not by way of limitation, more than two redundant systems 120 could be involved. Further, data other than alarm data may be processed by the flexible multiprocessor data system of the present invention. Still further, E-mail messages may be communicated with the system of the present invention by building the message into an event record for processing as if it were an alarm event. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

Having described the invention, what is claimed is:

1. An alarm data processing system for reporting to municipal authorities alarm events incurred by subscribers of central stations comprising:
   database means for storing identifying information for each of the subscribers;
   record means for storing event records;
   several input processor means each for (i) receiving, from at least one of the central stations, alarm data identifying at least one subscriber incurring an alarm event, (ii) validating the received alarm data based upon the identifying information in the database means, and (iii) generating and storing in the record means an event record having data based upon the validated alarm data;
   several output processor means each for (i) processing one of the event records from the record means so as to select a municipal authority and generate an alarm information report including at least part of the identifying information from the database means for the subscriber incurring the alarm event based upon the data in the event record being processed, and (ii) transmitting the alarm information report to the selected municipal authority.

2. The alarm data processing system of claim 1 further comprising:
   network transmitter means associated with at least one of the central stations for selectively transmitting alarm data from the central station to one of the input processing means.

3. The alarm data processing system of claim 1 further comprising means to temporarily establish a communication link between one of the central stations and one of the input processor means, whereby after the alarm data is received from the one central station, the one input processor means may thereafter receive alarm data from another central station.

4. The alarm data processing system of claim 1 further comprising:
   means for temporarily establishing a communication link between one of the output processor means and the municipal authority selected thereby, whereby after the output processor means transmits the alarm information report to the selected municipal authority, it may thereafter transmit an alarm information report to another municipal authority.

5. The alarm data processing system of claim 1 further comprising:
   busy/ready means associated with a first of the output processor means for indicating that the first output processor means has already selected the municipal authority being selected by a second of the output processor means;
   means associated with the second output processor means for generating a busy/ready record with data correlated to at least the event record being processed by the second output processor means; and
   means associated with the first output processor means for generating a second alarm information report based at least in part upon the data in the ready/busy record, whereby both the first-mentioned alarm information report and the second alarm information report are transmitted to the municipal authority by the first output processor means so the second output processor means may be freed up to process another one of the event records in the meantime.

6. The alarm data processing system of claim 1 further comprising:
   DTMF processing means for (i) receiving cancellation alarm data, the cancellation alarm data including data identifying one of the subscribers, (ii) validating the received cancellation alarm data against the identifying information in the database means, and (iii) generating and storing an event record having data based upon the validated cancellation alarm data;
   wherein each output processor means includes means operable when processing an event record based upon validated cancellation alarm data ("cancel event record") for (i) examining a group of other event records for an event record based upon validated alarm data ("alarm event record") identifying the same subscriber, (ii) if such an alarm event record is found, processing the cancel event record as if it were an alarm event record and including in the alarm information report that the report is of a cancellation, and (iii) if no such alarm record is found, discontinuing processing of the cancel event record, whereby a municipal authority need not be selected and an alarm information report need not be generated.

7. The alarm data processing system of claim 6 wherein the DTMF processing means includes means for receiving the cancellation alarm data from a telephone.

8. The alarm data processing system of claim 1 further comprising:
   DTMF processing means for (i) receiving cancellation alarm data, the cancellation alarm data including data identifying one of the subscribers, (ii) validating the received cancellation alarm data against the identifying information in the database means, and (iii) generating and storing an event record having data based upon the validated cancellation alarm data;

each output processor means including means operable when processing of an event record based upon validated alarm data ("alarm event record") for (i) examining a group of other event records for an event record based upon validated cancellation alarm data ("cancel event record") identifying the same subscriber, and (ii) if such a cancel event record is found, terminating processing of the alarm event record, whereby a municipal authority need not be selected and an alarm information report need not be generated.

9. The alarm data processing system of claim 8 wherein the DTMF processing means includes means for receiving the cancellation alarm data from a telephone.

10. The alarm data processing system of claim 1 wherein the database means further includes means for storing a vendor code and status information for each central station, the status information being indicative of whether the central station is active in the system, and wherein the alarm data further includes the vendor code of the central station from which the alarm data is received, the system further comprising:

receiving processor means for (i) receiving data from municipal authorities identifying a central station that is not to be active in the system, and (ii) for modifying the status information for that central station in the database means accordingly, whereby received alarm data identifying that central station will not be validated.

11. The alarm data processing system of claim 1 wherein the identifying information for each subscriber in the database means includes status information being indicative of whether the subscriber is active in the system, the system further comprising:

receiving processor means for (i) receiving data from municipal authorities identifying a subscriber that is not to be active in the system, and (ii) for modifying the status information for that subscriber in the database means accordingly, whereby received alarm data identifying that subscriber will not be validated.

12. The alarm data processing system of claim 1 wherein the input processor means store each event record along with a sequence number corresponding to the order of receipt of the alarm data, each output processor means including interleave means, operable upon completion of processing of the event record having a sequence number n, for selecting to be next processed by that output processor means one of the as-yet unprocessed event records having the lowest sequence number greater than n.

13. The alarm data processing system of claim 1 further comprising:

processor status means associated with each of the processor means for periodically being updated by the associated processor means with at least one of an indication of its function and the time of updating; and supervisor means monitoring the processor status means for determining when a processor has indicated at least one of (i) a time of updating more than a period of time before being monitored, and (ii) an erroneous function, whereby to determine whether that processor means may be faulty.

14. The alarm data processing system of claim 1, wherein alarm data is to be received over telephone lines interconnecting a plurality of the central stations and the input processor means, at least some of the input processor means each including busy-out capable modem means for selectively causing the telephone line to that input processor means to be busy in a busy-out mode of the modem means, whereby a call on that telephone line may be call-forwarded to another of the telephone lines.

15. An alarm data processing system for reporting to municipal authorities alarm events incurred by subscribers of central stations comprising:

database means for storing identifying information for each of the subscribers;

record means for storing event records;

several processor means, each including function means for selectively adapting the processor means to perform a variety of functions at least two of which are input processing and output processing;

each processor means, when it is adapted for performing input processing, for (i) receiving, from at least one of the central stations, alarm data identifying at least one subscriber incurring an alarm event, (ii) validating the received alarm data based upon the identifying information in the database means, and (iii) generating and storing in the record means an event record having data corresponding to the validated alarm data;

each processor means, when it is adapted for performing output processing, for (i) processing one of the event records from the record means so as to select a municipal authority and generate an alarm information report including at least part of the identifying information from the database means for the subscriber incurring the alarm event based upon the data in the event record being processed, and (ii) transmitting the alarm information report to the selected municipal authority; and supervisor means controlling the function means of each of the processor means for defining the respective function to be performed by that processor means.

16. The alarm data processing system of claim 15, a first number of the processor means being adapted for output processing, the supervisor means including means monitoring the record means for defining at least one additional processor means for output processing when a quantity of event records waiting to be processed exceeds a limit.

17. The alarm data processing system of claim 16, the limit being at least two times the first number of processor means.

18. The alarm data processing system of claim 15 further comprising:

processor status means associated with each of the processor means for periodically being updated by the associated processor means with an indication of its function;

the supervisor means including means monitoring the processor status means for determining when a processor means indicates a function other than that defined by the system supervisor for that processor means, whereby to determine whether that processor means may be faulty.

19. The alarm data processing system of claim 15 further comprising:
processor status means associated with each of the processor means for periodically being updated by the associated processor means with an indication of its function and the time of updating;
the supervisor means including means monitoring the processor status means for determining when a processor means has indicated at least one of (i) a time of updating more than a period of time before being monitored, and (ii) a function other than that defined by the system supervisor for that processor means, whereby to determine whether that processor means may be faulty.

20. The alarm data processing system of claim 15 further comprising:
network transmitter means associated with at least one of the central stations for selectively transmitting alarm data from the central station to one of the processor means adapted for input processing.

21. The alarm data processing system of claim 15 further comprising:
means for temporarily establishing a communication link between one of the central stations and one of the processor means adapted for input processing, whereby after the alarm data is received for the one central station, the one processor means may thereafter receive alarm data from another central station.

22. The alarm data processing system of claim 15 further comprising:
means, associated with each processor means and operable when the processor means is adapted for output processing, for temporarily establishing a communication link between the processor means and the municipal authority selected thereby, whereby after the processor means transmits the alarm information report to the selected authority, it may thereafter transmit an alarm information report to another municipal authority.

23. The alarm data processing system of claim 15 further comprising:
busy/ready means associated with a first of the processor means adapted for output processing for indicating that the first processor means has already selected the municipal authority being selected by a second of the processor means adapted for output processing;
means associated with the second processor means for generating a busy/ready record with data correlated to at least the event record being processed by the second processor means; and
means associated with the first processor means for generating a second alarm information report based at least in part upon the data in the ready/busy record, whereby both the first-mentioned alarm information report and the second alarm information report are transmitted to the municipal authority by the first processor means so the second processor means may be freed up to process another one of the event records in the meantime.

24. The alarm data processing system of claim 23 wherein the busy/ready means includes a flag which when set is indicative that the second processor has selected the same municipal authority, and wherein the second processor means includes means for setting the flag in the busy/ready means.

25. The alarm data processing system of claim 15 further comprising:
DTMF processing means for (i) receiving cancellation alarm data, the cancellation alarm data including data identifying one of the subscribers, (ii) validating the received cancellation alarm data against the identifying information in the database means, and (iii) generating an event record including at least part of the validated cancellation alarm data;
wherein each processor means adapted for output processing includes means operable when processing of an event record including validated cancellation alarm data ("cancel event record") for (i) examining a group of other event records for an event record based upon validated alarm data ("alarm event record") identifying the same subscriber, (ii) if such an alarm event record is found, processing the cancel event record as if it were an alarm event record and including in the alarm information report that the report is of a cancellation, and (iii) if no such alarm record is found, discontinuing processing of the cancel event record, whereby a municipal authority need not be selected and an alarm information report need not be generated.

26. The alarm data processing system of claim 25 wherein the DTMF processing means includes means for receiving the cancellation alarm data from a telephone.

27. The alarm data processing system of claim 15 further comprising:
DTMF processing means for (i) receiving cancellation alarm data, the cancellation alarm data including data identifying one of the subscribers, (ii) validating the received cancellation alarm data against the identifying information in the database means, and (iii) generating an event record including at least part of the validated cancellation alarm data;
each processor means adapted for output processing including means operable when processing of an event record based upon validated alarm data ("alarm event record") for (i) examining a group of other event records for an event record based upon validated cancellation alarm data ("cancel event record") identifying the same subscriber, and (ii) if such a cancel event record is found, terminating processing of the alarm event record, whereby a municipal authority need not be selected and an alarm information report need not be generated.

28. The alarm data processing system of claim 27 wherein the DTMF processing means includes means for receiving the cancellation alarm data from a telephone.

29. The alarm data processing system of claim 15 wherein the database means further includes means for storing a vendor code and status information for each central station, the status information being indicative of whether the central station is active in the system, and wherein the alarm data further includes the vendor code of the central station from which the alarm data is received, the system further comprising:
receiving processor means for (i) receiving data from municipal authorities identifying a central station that is not to be active in the system, and (ii) for modifying the status information for that central station in the database means accordingly, whereby received alarm data identifying that central station will not be validated.

30. The alarm data processing system of claim 15 wherein the identifying information for each subscriber in the database means further includes status information being indicative of whether the subscriber is active in the system, the system further comprising:

receiving processor means for (i) receiving data from municipal authorities identifying a subscriber that is not to be active in the system, and (ii) for modifying the status information for that subscriber in the database means accordingly, whereby received alarm data identifying that subscriber will not be validated.

31. The alarm data processing system of claim 15 wherein those processor means adapted for input processing store each event record along with a sequence number corresponding to the order of receipt of the alarm data, each processor means adapted for output processing including means, operable upon completion of processing the event record having a sequence number n, for selecting to be next processed by that processor means one of the as-yet unprocessed event records having the lowest sequence number greater than n.

32. The alarm data processing system of claim 15 wherein alarm data is to be received over telephone lines interconnecting a plurality of the central stations and those processor means adapted for input processing, at least some of the processor means including busy-out capable modem means for selectively causing the telephone line to that processor means to be busy in a busy-out mode of the modem means, whereby a call on that telephone line may be call-forwarded to another one of the telephone lines.

33. Redundant alarm data processing systems for reporting to municipal authorities, alarm events incurred by subscribers of central stations, each system comprising:

database means for storing identifying information for each of the subscribers;

record means for storing event records;

several input processor means each for (i) receiving, from at least one of the central stations, alarm data identifying at least one subscriber incurring an alarm event, (ii) validating the received alarm data based upon the identifying information in the database means, and (iii) generating and storing in the record means an event record having data corresponding to the validated alarm data; and several output processor means each for (i) processing one of the event records from the record means so as to select a municipal authority and generate an alarm information report including at least part of the identifying information from the database means for the subscriber incurring the alarm event based upon the data in the event record being processed, and (ii) transmitting the alarm information report to the selected municipal authority; and at least one of the systems further comprising:

supervisor means monitoring the record means of that system for transferring a group of event records not yet processed to another one of the systems for processing by the output processor means of that other system.

34. The redundant alarm data processing systems of claim 33, wherein alarm data is to be received over telephone lines interconnecting a plurality of the central stations and the input processor means of the systems, at least some of the input processor means in a first of the systems each including busy-out capable modem means for selectively causing the telephone line to that input processor means to be busy in a busy-out mode of the modem means, whereby a call on that telephone line may be call-forwarded to another of the telephone lines such as a telephone line to the input processor means of a second of the systems.

35. Redundant alarm data processing systems for reporting to municipal authorities alarm events incurred by subscribers of central stations, each system comprising:

database means for storing identifying information for each of the subscribers;

record means for storing event records;

several input processor means, each including function means for selectively adapting the processor means for performing a variety of functions two of which are input processing and output processing;

each processor means, when it is adapted for performing input processing, for (i) receiving, from at least one of the central stations, alarm data identifying at least one subscriber incurring an alarm event, (ii) validating the received alarm data based upon the identifying information in the database means, and (iii) generating and storing in the record means an event record having data corresponding to the validated alarm data;

each processor means, when it is adapted for performing output processing, for (i) processing one of the event records from the record means so as to select a municipal authority and generate an alarm information report including at least part of the identifying information from the database means for the subscriber incurring the alarm event based upon the data in the event record being processed, and (ii) transmitting the alarm information report to the selected municipal authority; and supervisor means controlling the function means of each of the processor means for defining the respective function to be performed by that processor means; and the supervisor means of at least one of the systems including means monitoring the record means of that system for transferring a group of event records not yet processed to another one of the systems for processing by the output processor means of that other system.

36. The redundant alarm data processing systems of claim 35, wherein alarm data is to be received over telephone lines interconnecting a plurality of the central stations and the processor means of the systems, at least some of the processor means in a first of the systems each including busy-out capable modem means for selectively causing the telephone line to that processor means to be busy in a busy-out mode of the modem means, whereby a call on that telephone line may be call-forwarded to another one of the telephone lines such as the telephone line to one of the processor means of a second of the systems.

37. A data processing system comprising:

record means for storing event records;

means receiving sets of data from a plurality of sources for (i) selectively connecting to the sources, (ii) generating an event record for each of a plurality of the sets of data, (iii) storing each event record, along with a sequence number corresponding to the order of receipt of the set of data in the record means, and (iv) disconnecting from each source prior to an event record based on data from that source being processed; and several processor means each for processing one of the event records from the record means, each of the processor means including interleave means, operative upon completion of processing of the event record having a sequence number n, for automatically selecting to be next processed by that processor means one of the as-yet unprocessed event records having the lowest sequence number greater than n.

38. The data processing system of claim 37 wherein each event record includes a status flag being initially set to indicate that the event record is as-yet unprocessed, each processor means including means for modifying the status flag of the selected event record, whereby that event record will not thereafter be as-yet unprocessed for selection by one of the interleave means.

39. The data processing system of claim 37 wherein processing of an event record includes generating a report and selecting a destination for receipt of the report, the system further comprising:

communication means associated with the processor means for transmitting the report from one of the processor means to the selected destination.

40. The data processing system of claim 39 further comprising:

busy/ready means associated with a first of the processor means for indicating that the first processor means has already selected a destination being selected by a second of the processor means;

means associated with the second processor means for generating a busy/ready record with data correlated to at least the event record being processed by the second processor means; and means associated with the first processor means for generating a second report based at least in part upon the data in the ready/busy record, whereby both the first-mentioned report and the second report are transmitted to the destination by the first processor means so the second processor means may be freed up to process another one of the event records in the meantime.

41. The alarm data system of claim 40 wherein the busy/ready means includes a flag which when set is indicative that the second processor has selected the same destination, and wherein the second processor means includes means for setting the flag in the busy/ready means.

42. The data processing system of claim 37 wherein the data in any of the sets of data includes a first portion identifying a source for the data and a second portion indicative of whether the data is for cancellation;

each processor means including means operable when processing an event record based upon data having a second portion which is not indicative of a cancellation ("actual event record") for (i) examining a group of other event records for an event record based upon data having a second portion indicative of a cancellation ("cancel event record") and a first portion identifying the same source as the actual event record, and (ii) if such a cancel event record is found, terminating processing of the actual event record.

43. A data processing system comprising:
record means for storing event records;

means receiving sets of data for (i) generating an event record for each of a plurality of the sets of data, and (ii) storing each event record, along with a sequence number corresponding to the order of receipt of the set of data, in the record means;

several processor means each for processing one of the event records from the record means, each of the processor means including (i) interleave means, operative upon completion of processing of the event record having a sequence number n, for selecting to be next processed by that processor means one of the as-yet unproduced event records having the lowest sequence number greater than n, and (ii) function means for selectively adapting the processor means to perform a variety of functions at least one of which is processing event records; and supervisor means controlling the function means of each of the processor means for defining the respective function to be performed by that processor means.

44. The data processing system of claim 43, a first number of the processor means being adapted for processing event records, the supervisor means including means monitoring the record means for defining at least one additional processor means for processing event records when a quantity of event records waiting to be processed exceeds a limit.

45. The data processing system of claim 44, the limit being at least two times the first number of processor means.

46. The alarm data processing system of claim 43 further comprising:

processor status means associated with each of the processor means for periodically being updated by the associated processor means with at least one of an indication of its function and the time of updating, wherein the supervisor means includes means monitoring the processor status means for determining when a processor has indicated at least one of (i) a time of updating more than a period of time before being monitored, and (ii) an erroneous function, whereby to determine whether that processor means may be faulty.

47. A telephone call initiated data processing system comprising:

record means for storing an event record in response to receipt of data transmitted in a telephone call;

several processor means, each including function means for selectively adapting the processor means to perform a variety of functions at least two of which are input processing and output processing;

each processor means, when it is adapted for performing input processing, receiving sets of data for (i) generating an event record for each of a plurality of the sets of data, and (ii) storing each event record in the record means;

each processor means, when it is adapted for performing output processing, for processing one of the event records from the record means; and supervisor means controlling the function means of each of the processor means for, selectively defining whether that processor means is to be adapted for performing one of input processing and output processing functions.

48. The telephone call initiated data processing system of claim 47, a first number of the processor means being adapted for output processing, the supervisor means including means monitoring the record means for defining at least one additional processor means for output processing when a quantity of event records waiting to be processed exceeds a limit.

49. The telephone call initiated data processing system of claim 48, the limit being at least two times the first number of processor means.

50. Redundant data processing systems each comprising:
record means for storing event records:
means receiving sets of data for (i) generating an event record for each of a plurality of the sets of data, and (ii) storing each event record, along with a sequence number corresponding to the order of receipt of the set of data, in the record means; and
several processor means each for processing one of the event records from the record means, each of the processor means including interleave means, operative upon completion of processing of the event record having a sequence number n, for selecting to be next processed by that processor means one of the as-yet unprocessed event records having the lowest sequence number greater than n;
at least one of the systems further comprising:
supervisor means monitoring the record means of that system for transferring a group of event records not yet processed to another one of the systems for processing by the processor means of that other system.

51. The redundant data processing systems of claim 50 wherein each event record includes a status being initially set to indicate that the event record is as-yet unprocessed, each processor means including means for modifying the status flag of the selected event record, whereby that event record will not thereafter be as-yet unprocessed for selection by one of the interleave means.

52. The redundant data processing systems of claim 50 wherein processing of an event record includes generating a report and selecting a destination for receipt of the report, the system further comprising:
communication means associated with the processor means for transmitting the report from one of the processor means to the selected destination.

53. The redundant data processing systems of claim 52 further comprises in each system:
busy/ready means associated with a first of the processor means for indicating that the first processor means has already selected a destination being selected by a second of the processor means;
means associated with the second processor means for generating a busy/ready record with data correlated to at least the event record being processed by the second processor means; and
means associated with the first processor means for generating a second report based at least in part upon the data in the ready/busy record, whereby both the first-mentioned report and the second report are transmitted to the destination by the first processor means so the second processor means may be freed up to process another one of the event records in the meantime.

54. The redundant data processing systems of claim 53 wherein the busy/ready means includes a flag which when set is indicative that the second processor has selected the same destination, and wherein the second processor means includes means for setting the flag in the busy/ready means.

55. A method of reporting alarm events to municipal authorities incurred by subscribers of central stations comprising:
storing identifying information for each of the subscribers;
in response to subscribers having alarm events:
(i) selectively establishing electronic communication with each such subscriber's central station and, while so connected, receiving, from the central stations, sets of alarm data, each set of alarm data identifying at least one subscriber incurring an alarm event,
(ii) validating each of the sets of received alarm data based upon the stored identifying information,
(iii) generating and storing for each set of validated alarm data an event record having data based upon the validated alarm data, and
(iv) terminating electronic communication with the central station;
processing the stored event records based upon data from so-disconnected central stations so as to select, for each event record being processed, a municipal authority and to generate, for each event record being processed, an alarm information report including at least part of the stored identifying information for the subscriber incurring the alarm event, all based upon the data in the stored event record being processed; and
transmitting each alarm information report to the selected municipal authority.

56. The alarm reporting method of claim 55 further comprising establishing a communication link with the selected municipal authority to transmit the alarm information report, and thereafter terminating the communication link.

57. The alarm reporting method of claim 55 wherein the stored identifying information for each subscriber includes status information being indicative of whether the subscriber is active, the method further comprising:
receiving data from one of the municipal authorities identifying a subscriber that is not to be active; and
modifying the stored status information for that subscriber accordingly, whereby received alarm data identifying that subscriber will not be validated.

58. The alarm reporting method of claim 55 further comprising:
storing each event record with a sequence number corresponding to the order of receipt of the alarm data; and
upon completion of processing of the event record having a sequence number n, initiating processing of one of the as-yet unprocessed event records having the lowest sequence number greater than n.

59. A method of reporting alarm events to municipal authorities incurred by subscribers of central stations comprising:
storing identifying information for each of the subscribers;
receiving, from the central stations, sets of alarm data, each set of alarm data identifying at least one subscriber incurring an alarm event;
validating each of the sets of received alarm data based upon the stored identifying information;
generating and storing for each set of validated alarm data an event record having data based upon the validated alarm data;

processing the stored event records so as to select, for each event record being processed, a municipal authority and to generate, for each event record being processed, an alarm information report including at least part of the stored identifying information for the subscriber incurring the alarm event, all based upon the data in the stored event record being processed wherein first and second of the stored event records are being separately but concurrently processed;

indicating that in processing of the first event record, the municipal authority selected thereby is also being selected in processing of the second event record;

generating a busy/ready record with data correlated to at least the second event record;

generating a second alarm information report based at least in part upon the data in the ready/busy record; and transmitting each alarm information report to the selected municipal authority whereby both the first-mentioned alarm information report and the second alarm information report are transmitted to the municipal authority.

60. A method of reporting alarm events to municipal authorities incurred by subscribers of central stations comprising:

storing identifying information for each of the subscribers;

receiving, from the central stations, sets of alarm data, each set of alarm data identifying at least one subscriber incurring an alarm event;

validating each of the sets of received alarm data based upon the stored identifying information;

generating and storing for each set of validated alarm data an event record having data based upon the validated alarm data;

receiving cancellation alarm data, the cancellation alarm data including data identifying one of the subscribers;

validating the received cancellation alarm data against the stored identifying information;

generating and storing an event record having data based upon the validated cancellation alarm data;

processing the stored event records so as so select, for each event record being processed, a municipal authority and to generate, for each event record being processed, an alarm information report including at least part of the stored identifying information for the subscriber incurring the alarm event, all based upon the data in the stored event record being processed;

when processing a stored event record based upon validated cancellation alarm data ("cancel event record"):

examining a group of other stored event records for an event record based upon validated alarm data ("alarm event record") identifying the same subscriber;

if such an alarm event record is found, processing the cancel event record as if it were an alarm event record and including in the alarm information report that the report is of a cancellation; and if no such alarm record is found, discontinuing processing of the cancel event record, whereby a municipal authority need not be selected and an alarm information report need not be generated; and transmitting each alarm information report to the selected municipal authority.

61. The alarm reporting method of claim 60 further comprising receiving the cancellation alarm data from a telephone.

62. A method of reporting alarm events to municipal authorities incurred by subscribers of central stations comprising:

storing identifying information for each of the subscribers;

receiving, from the central stations, sets of alarm data, each set of alarm data identifying at least one subscriber incurring an alarm event;

validating each of the sets of received alarm data based upon the stored identifying information;

generating and storing for each set of validated alarm data an event record having data based upon the validated alarm data;

receiving cancellation alarm data, the cancellation alarm data including data identifying one of the subscribers;

validating the received cancellation alarm data against the stored identifying information;

generating and storing an event record having data based upon the validated cancellation alarm data;

processing the stored event records so as so select, for each event record being processed, a municipal authority and to generate, for each event record being processed, an alarm information report including at least part of the stored identifying information for the subscriber incurring the alarm event, all based upon the data in the stored event record being processed;

when processing a stored event record based upon validated alarm data ("alarm event record"):

examining a group of other stored event records for an event record based upon validated cancellation alarm data ("cancel event record") identifying the same subscriber;

if such a cancel event record is found, terminating processing of the alarm event record, whereby a municipal authority need not be selected and an alarm information report need not be generated; and transmitting each alarm information report to the selected municipal authority.

63. The alarm reporting method of claim 62 further comprising receiving the cancellation alarm data from a telephone.

64. A method of reporting alarm events to municipal authorities incurred by subscribers of central stations comprising:

storing identifying information for each of the subscribers;

receiving, from the central stations, sets of alarm data, each set of alarm data identifying at least one subscriber incurring an alarm event;

validating each of the sets of received alarm data based upon the stored identifying information;

generating and storing for each set of validated alarm data an event record having data based upon the validated alarm data;

processing the stored event records so as so select, for each event record being processed, a municipal authority and to generate, for each event record being processed, an alarm information report including at least part of the stored identifying information for the subscriber incurring the alarm event, all based upon the data in the stored event record being processed;

storing a vendor code and status information for each central station, the status information being indicative of whether the central station is active and wherein the alarm data further includes the vendor code of the central station from which the alarm data is received;

receiving data from one of the municipal authorities identifying a central station that is not to be active; and modifying the stored status information for that central station accordingly, whereby received alarm data identifying that central station will not be validated.

65. A data processing method comprising:

selectively establishing electronic communication with data sources;

receiving sets of data from the data sources;

generating and storing an event record for each of a plurality of the sets of data;

storing with each event record a sequence number corresponding to the order of receipt of the set of data upon which the event record is based;

disconnecting from each data source after receiving its sets of data;

processing generally concurrently several of the stored event records based on data from disconnected sources; and upon completion of processing of one of the stored event records having a sequence number n, initiating processing of one of the as-yet unprocessed stored event records having the lowest sequence number greater than n.

66. The data processing method of claim 65 wherein processing of an event record includes generating a report and selecting a destination for receipt of the report and wherein first and second of the stored event records are being separately but concurrently processed, the method further comprising:

indicating that in processing of the first event record, the destination selected thereby is also being selected in processing of the second event record;

generating a busy/ready record with data correlated to at least the second event record; and generating a second report based at least in part upon the data in the ready/busy record, whereby both the first-mentioned report and the second report are transmitted to the destination.

67. A data processing system comprising:

record means for storing event records;

a plurality of processor means each for processing one of the event records stored in the record means including generating a report and selecting a destination for receipt of the report;

busy/ready means associated with a first of the processor means for indicating that the first processor means has already selected a destination being selected by a second of the processor means;

means associated with the second processor means for generating a busy/ready record with data correlated to at least the event record being processed by the second processor means; and means associated with the first processor means for generating a second report based at least in part upon the data in the ready/busy record, whereby both the first-mentioned report and the second report are transmittable to the destination from the first processor means so the second processor means may be freed up to process another one of the event records in the meantime.

68. The data processing system of claim 67 wherein the busy/ready means includes a flag which when set is indicative that the second processor has selected the same destination, and wherein the second processor means includes means for setting the flag in the busy/ready means.

69. Redundant data processing systems each comprising:

record means for storing event records;

a plurality of processor means each for processing one of the event records stored in the record means including generating a report and selecting a destination for receipt of the report;

busy/ready means associated with a first of the processor means has already selected a destination being selected by a second of the processor means;

means associated with the second processor means for generating a busy/ready record with data correlated to at least the event record being processed by the second processor means;

means associated with the first processor means for generating a second report based at least in part upon the data in the ready/busy record, whereby both the first-mentioned report and the second report are transmittable to the destination from the first processor means so the second processor means may be freed up to process another one of the event records in the meantime; and at least one of the systems further comprising:

supervisor means monitoring the record means of that system for transferring a group of event records not yet processed to another one of the systems for processing by the processor means of that other system.

70. The data processing system of claim 69 wherein the busy/ready means includes a flag which when set is indicative that the second processor has selected the same destination, and wherein the second processor means includes means for setting the flag in the busy/ready means.

71. An alarm data processing system for reporting to municipal authorities alarm events incurred by subscribers of central stations comprising:

database means for storing identifying information for each of the subscribers;

record means for storing event records;

a plurality of processor means for (i) receiving, from at least one of the central stations, alarm data identifying at least one subscriber incurring an alarm event, (ii) validating the received alarm data based upon the identifying information in the database means, (iii) generating and storing in the record means an event record having data based upon the validated alarm data, (iv) processing one of the event records from the record means so as to select a municipal authority and generate an alarm information report including at least part of the identifying information from the database means for the subscriber incurring the alarm event based upon the data in the event record being processed, and (v) transmitting the alarm information report to the selected municipal authority;

DTMF processing means for (i) receiving cancellation alarm data, the cancellation alarm data including data identifying one of the subscribers, (ii) validating the received cancellation alarm data against the identifying information in the database means, and (iii) generating and storing an event record having data based upon the validated cancellation alarm data; and wherein at least one of the processor means includes means operable when processing an event record based upon validated cancellation alarm data ("cancel event record") for (i) examining a group of other event records for an event record based upon validated alarm data ("alarm event record") identifying the same subscriber, (ii) if such an alarm event record is found, processing the cancel event record as if it were an alarm event record and including in the alarm information report that the report is of a cancellation, and (iii) if no such alarm record is found, discontinuing processing of the cancel event record, whereby a municipal authority need not be selected and an alarm information report need not be generated.

72. The alarm data processing system of claim 71 wherein the DTMF processing means includes means for receiving the cancellation alarm data from a telephone.

73. An alarm data processing system for reporting to municipal authorities alarm events incurred by subscribers of central stations comprising:

database means for storing identifying information for each of the subscribers;

record means for storing event records;

a plurality of processor means for (i) receiving, from at least one of the central stations, alarm data identifying at least one subscriber incurring an alarm event, (ii) validating the received alarm data based upon the identifying information in the database means, (iii) generating and storing in the record means an event record having data based upon the validated alarm data, (iv) processing one of the event records from the record means so as to select a municipal authority and generate an alarm information report including at least part of the identifying information from the database means for the subscriber incurring the alarm event based upon the data in the event record being processed, and (v) transmitting the alarm information report to the selected municipal authority;

DTMF processing means for (i) receiving cancellation alarm data, the cancellation alarm data including data identifying one of the subscribers, (ii) validating the received cancellation alarm data against the identifying information in the database means, and (iii) generating and storing an event record having data based upon the validated cancellation alarm data; and wherein at least one of the processor means includes means operable when processing of an event record based upon validated alarm data ("alarm event record") for (i) examining a group of other event records for an event record based upon validated cancellation alarm data ("cancel event record") identifying the same subscriber, and (ii) if such a cancel event record is found, terminating processing of the alarm event record, whereby a municipal authority need not be selected and an alarm information report need not be generated.

74. The alarm data processing system of claim 73 wherein the DTMF processing means includes means for receiving the cancellation alarm data from a telephone.

75. A data processing system comprising:

record means for storing event records;

means receiving sets of data for (i) generating an event record for each of a plurality of the sets of data, and (ii) storing each event record, wherein the data in any of the sets of data includes a first portion identifying a source for the data and a second portion indicative of whether the data is for cancellation;

processor means for processing one of the event records from the record means, the processor means including means operable when processing an event record based upon data having a second portion which is not indicative of a cancellation ("actual event record") for (i) examining a group of other event records for an event record based upon data having a second portion indicative of a cancellation ("cancel event record") and a first portion identifying the same source as the actual event record, and (ii) if such a cancel event record is found, terminating processing of the actual event record.

76. An alarm data processing system for reporting to municipal authorities alarm events incurred by subscribers of central stations comprising:

database means for storing (i) identifying information for each of the subscribers and (ii) a vendor code and status information for each central station, the status information being indicative of whether the central station is active in the system;

processor means for (i) receiving, from at least one of the central stations, alarm data identifying at least one subscriber incurring an alarm event and including the vendor code of the central station from which the alarm data is received, (ii) validating the received alarm data based upon the identifying information in the database means, and (iii) generating an event record having data corresponding to the validated alarm data for use in selecting a municipal authority and generating an alarm information report; and receiving processor means for (i) receiving data from municipal authorities identifying a central station that is not to be active in the system, and (ii) for modifying the status information for that central station in the database means accordingly, whereby received alarm data identifying that central station will not be validated.

77. An alarm data processing system for reporting to municipal authorities alarm events incurred by subscribers of central stations comprising:

database means for storing (i) identifying information for each of the subscribers including status information being indicative of whether the subscriber is active in the system;

processor means for (i) receiving, from at least one of the central stations, alarm data identifying at least one subscriber receiving an alarm event, (ii) validating the received alarm data based upon the identifying information in the database means, and (iii) generating an event record having data corresponding to the validated alarm data for use in selecting a municipal authority and generating an alarm information report; and receiving processor means for (i) receiving data from municipal authorities identifying a subscriber that is not to be active in the system, and (ii) for modifying the status information for that subscriber in the database means accordingly, whereby received alarm data identifying that subscriber will not be validated.

78. A data processing method comprising:

receiving sets of data;

generating and storing an event record for each of a plurality of the sets of data;

separately but concurrently processing in first and second processors at least a first and second of the event records, wherein such processing includes generating a report and selecting a destination for receipt of the report;

indicating that in processing of the first event record, the destination selected thereby is also being selected in processing of the second event record;

generating a busy/ready record with data correlated to at least the second event record; and one of the processors generating a report based at least in part upon the data in the first event record and a second report based at least in part upon the data in the ready/busy record, whereby both the first-mentioned report and the second report are transmittable to the destination from the first processor.

79. A method of reporting alarm events to municipal authorities incurred by subscribers of central stations comprising:

storing identifying information for each of the subscribers;

receiving, from the central stations, sets of alarm data, each set of alarm data identifying at least one subscriber incurring an alarm event;

validating each of the sets of received alarm data based upon the stored identifying information;

receiving cancellation alarm data, the cancellation alarm data including data identifying one of the subscribers;

validating the received cancellation alarm data against the stored identifying information;

generating and storing an event record having data based upon the validated cancellation alarm data; and processing validated alarm data including:

selecting a municipal authority and generating an alarm information report including at least part of the stored identifying information for the subscriber incurring the alarm event based upon the validated alarm data;

examining for an event record based upon validated cancellation alarm data ("cancel event record") identifying the same subscriber; and either transmitting the alarm information report to the selected municipal authority or, if such a cancel event record is found, terminating processing of the validated alarm data, whereby a municipal authority need not be selected and an alarm information report need not be generated.

80. The alarm reporting method of claim 79 further comprising receiving the cancellation alarm data from a telephone.

81. A method of reporting alarm events to municipal authorities incurred by subscribers of central stations comprising:

storing identifying information for each of the subscribers;

receiving, from the central stations, sets of alarm data, each set of alarm data identifying at least one subscriber incurring an alarm event;

validating each of the sets of received alarm data based upon the stored identifying information;

generating and storing for each set of validated alarm data an event record having data based upon the validated alarm data;

receiving cancellation alarm data, the cancellation alarm data including data identifying one of the subscribers; and validating the received cancellation alarm data against the stored identifying information;

processing validated cancellation data including:

examining for an event record based upon validated alarm data ("alarm event record") identifying the same subscriber;

if such an alarm event record is found, selecting a municipal authority and generating an alarm information report including at least part of the stored identifying information for the subscriber incurring the alarm event and including in the alarm information report that the report is of a cancellation and transmitting the alarm information report to the selected municipal authority; and if no such alarm record is found, discontinuing processing of the cancel event record, whereby a municipal authority need not be selected and an alarm information report need not be generated.

82. The alarm reporting method of claim 81 further comprising receiving the cancellation alarm data from a telephone.

83. A method of reporting alarm events to municipal authorities incurred by subscribers of central stations comprising:

storing identifying information for each of the subscribers;

storing a vendor code and status information for each central station, the status information being indicative of whether the central station is active in the system;

receiving, from the central stations, sets of alarm data, each set of alarm data identifying at least one subscriber incurring an alarm event and including the vendor code of the central station from which the alarm data is received;

validating each of the sets of received alarm data based upon the stored identifying information;

receiving data from one of the municipal authorities identifying a central station that is not to be active in the system;

modifying the stored status information for that central station accordingly, whereby received alarm data identifying that central station will not be validated;

processing validated alarm data including selecting a municipal authority and generating an alarm information report including at least part of the stored identifying information for the subscriber incurring the alarm event; and transmitting each alarm information report to the selected municipal authority.

84. A method of reporting alarm events to municipal authorities incurred by subscribers of central stations comprising:

storing identifying information for each of the subscribers including status information being indicative of whether the subscriber is active in the system;

receiving, from the central stations, sets of alarm data, each set of alarm data identifying at least one subscriber incurring an alarm event;

validating each of the sets received alarm data based upon the stored identifying information;

receiving data from one of the municipal authorities identifying a subscriber that is not to be active in the system; and modifying the stored status information for that subscriber accordingly, whereby received alarm data identifying that subscriber will not be validated;

processing validated alarm data including selecting a municipal authority and generating an alarm information report including at least part of the stored identifying information for the subscriber incurring the alarm event; and transmitting each alarm information report to the selected municipal authority.

85. An alarm data processing system for reporting to municipal authorities alarm events incurred by sources comprising:

database means for storing identifying information for a plurality of the sources;

record means for storing event records;

several input processor means each for (i) receiving alarm data identifying the source incurring an alarm event, (ii) validating the received alarm data based upon the identifying information in the database means, and (iii) generating and storing in the record means an event record having data based upon the validated alarm data;

several output processor means each for (i) processing one of the event records from the record means so as to select a municipal authority and generate an alarm information report including at least part of the identifying information from the database means for the source incurring the alarm event based upon the data in the event record being processed, and (ii) transmitting the alarm information report to the selected municipal authority.

86. An alarm data processing system for reporting to municipal authorities alarm events incurred by sources comprising:

database means for storing identifying information for a plurality of the sources;

record means for storing event records;

several processor means, each including functions means for selectively adapting the processor means to perform a variety of functions at least two of which are input processing and output processing;

each processor means, when it is adapted for performing input processing, for (i) receiving alarm data identifying the source incurring an alarm event, (ii) validating the received alarm data based upon the identifying information in the database means, and (iii) generating and storing in the record means an event record having data corresponding to the validated alarm data;

each processor means, when it is adapted for performing output processing, for (i) processing one of the event records from the record means so as to select a municipal authority and generate an alarm information report including at least part of the identifying information from the database means for the source incurring the alarm event based upon the data in the event record being processed, and (ii) transmitting the alarm information report to the selected municipal authority; and supervisor means controlling the function means of each of the processor means for defining the respective function to be performed by that processor.

87. Redundant alarm data processing systems for reporting to municipal authorities alarm events incurred by sources, each system comprising:

database means for storing identifying information for a plurality of the sources;

record means for storing event records;

several input processor means each for (i) receiving alarm data identifying at least one source incurring an alarm event, (ii) validating the received alarm data based upon the identifying information in the database means, and (iii) generating and storing in the record means an event record having data corresponding to the validated alarm data; and several output processor means each for (i) processing one of the event records from the record means so as to select a municipal authority and generate an alarm information report including at least part of the identifying information from the database means for the source incurring the alarm event based upon the data in the event record being processed, and (ii) transmitting the alarm information report tot he selected municipal authority; and at least one of the systems further comprising:

supervisor means monitoring the record means of that system for transferring a group of event records not yet processed to another one of the systems for processing by the output processor means of that other system.

88. Redundant alarm data processing systems for reporting to municipal authorities alarm events incurred by sources, each system comprising:

database means for storing identifying information for a plurality of the sources;

record means for storing event records;

several input processor means, each including function means for selectively adapting the processor means for performing a variety of functions two of which are input processing and output processing;

each processor means, when it is adapted for performing input processing, for (i) receiving alarm data identifying at least one source incurring an alarm event, (ii) validating the received alarm data based upon the identifying information in the database means, and (iii) generating and storing in the record means an event record having data corresponding to the validated alarm data;

each processor means, when it is adapted for performing output processing, for (i) processing one of the event records from the record means so as to select a municipal authority and generate an alarm information report including at least part of the identifying information from the database means for the source incurring the alarm event based upon the data in the event record being processed, and (ii) transmitting the alarm information report to the selected municipal authority; and supervisor means controlling the function means of each of the processor means for defining the respective function to be performed by that processor means; and the supervisor means of at least one of the systems including means monitoring the record means of that system for transferring a group of event records not yet processed to another one of the systems for processing by the output processor means of that other system.

89. An alarm data processing system for reporting to municipal authorities alarm events incurred by sources comprising:

database means for storing (i) identifying information for a plurality of the sources including status information being indicative of whether the source is active in the system;

processor means for (i) receiving alarm data identifying at least one source receiving an alarm event, (ii) validating the received alarm data based upon the identifying information in the database means, and (iii) generating an event record having data corresponding to the validated alarm data for use in selecting a municipal authority and generating an alarm information report; and receiving processor means for (i) receiving data from municipal authorities identifying a source that is not to be active in the system, and (ii) for modifying the status information for that source in the database means accordingly, whereby received alarm data identifying that source will not be validated.

90. A method of reporting alarm events to municipal authorities incurred by sources comprising:

storing identifying information for a plurality of the sources including status information being indicative of whether the source is active in the system;

receiving sets of alarm data, each set of alarm data identifying at least one source incurring an alarm event;

validating each of the sets received alarm data based upon the stored identifying information;

receiving data from one of the municipal authorities identifying a source that is not to be active in the system;

modifying the stored status information for that source accordingly, whereby received alarm data identifying that source will not be validated;

processing validated alarm data including selecting a municipal authority and generating an alarm information report including at least part of the stored identifying information for the source incurring the alarm event; and transmitting each alarm information report to the selected municipal authority.

* * * * *